(12) United States Patent
Marquez et al.

(10) Patent No.: US 12,455,491 B2
(45) Date of Patent: Oct. 28, 2025

(54) CASCADABLE PHOTONIC CIRCUITS WITH NONLINEAR AMPLITUDE THRESHOLDERS

(71) Applicant: Milkshake Technology Inc., Menlo Park, CA (US)

(72) Inventors: Bicky A. Marquez, Kingston (CA); Joshua Baxter, Ottawa (CA); Ahmed Khaled, Kingston (CA); Alireza Samani, Ottawa (CA); Orad Reshef, Ottawa (CA); Bhavin J. Shastri, Kingston (CA); Douglas H. Wightman, Kingston (CA)

(73) Assignee: Milkshake Technology Inc., Menlo Park, CA (US)

( * ) Notice: Subject to any disclaimer, the term of this patent is extended or adjusted under 35 U.S.C. 154(b) by 178 days.

(21) Appl. No.: 18/232,017

(22) Filed: Aug. 9, 2023

(65) Prior Publication Data

US 2025/0053065 A1    Feb. 13, 2025

(51) Int. Cl.
*G02F 1/365*       (2006.01)
*G02F 1/225*       (2006.01)
(Continued)

(52) U.S. Cl.
CPC ............. *G02F 1/365* (2013.01); *G02F 1/225* (2013.01); *G02F 1/3507* (2021.01);
(Continued)

(58) Field of Classification Search
CPC ...... G02F 1/225; G02F 1/3507; G02F 1/3521; G02F 1/3526; G02F 1/365; G02F 3/00; G02F 2203/20
See application file for complete search history.

(56) References Cited

U.S. PATENT DOCUMENTS 7,203,396 B2 * 4/2007 Shahar ................. G02B 6/2804
                                                      385/5
7,657,188 B2 * 2/2010 Covey ...................... G02F 3/00
                                                      398/201
(Continued)

FOREIGN PATENT DOCUMENTS

EP        3506190 A1    7/2019

OTHER PUBLICATIONS

Alipour-Banaei, H., et al., "Photonic crystal based 1-bit full-adder optical circuit by using ring resonators in a nonlinear structure," Photonics and Nanostructures—Fundamentals and Applications, vol. 24, May 2017, pp. 29-34.
(Continued)

*Primary Examiner* — Daniel Petkovsek
(74) *Attorney, Agent, or Firm* — Fenwick & West LLP

(57) ABSTRACT

A photonic circuit with at least one nonlinear amplitude thresholder for correcting errors produced by linear photonic logic. One or more photonic input gates of the photonic circuit receive one or more input signals and generate one or more photonic signals based on the one or more photonic input signals. A first set of one or more photonic gates of the photonic circuit generates one or more intermediate photonic signals based on the one or more photonic signals. The at least one nonlinear amplitude thresholder generates at least one photonic thresholding signal based on the one or more intermediate photonic signals, the at least one nonlinear amplitude thresholder operating in a first operating regime, second operating regime, and/or third operating regime. A second set of one or more photonic gates of the photonic circuit generates one or more photonic output signals based on the at least one photonic thresholding signal.

20 Claims, 15 Drawing Sheets

(51) Int. Cl.
*G02F 1/35* (2006.01)
*G02F 3/00* (2006.01)

(52) U.S. Cl.
CPC .......... *G02F 1/3521* (2013.01); *G02F 1/3526* (2013.01); *G02F 3/00* (2013.01); *G02F 2203/20* (2013.01)

(56) References Cited

U.S. PATENT DOCUMENTS

| | | | |
|---|---|---|---|
| 8,681,982 | B2 | 3/2014 | Wiseman et al. |
| 10,432,304 | B2* | 10/2019 | Fok .................... H04K 3/25 |
| 10,613,415 | B2* | 4/2020 | Santori .................... G02F 3/00 |
| 10,924,269 | B1 | 2/2021 | Ding et al. |
| 11,238,428 | B1 | 2/2022 | Nagarajan |
| 11,251,947 | B1 | 2/2022 | Wang et al. |
| 12,078,909 | B2* | 9/2024 | Hong .................... G02F 1/2257 |
| 2012/0033966 | A1* | 2/2012 | Rosenbluth ............ G06E 3/003 398/38 |
| 2020/0327093 | A1 | 10/2020 | Nagarajan |
| 2021/0273724 | A1* | 9/2021 | Yap .................... H04B 10/2575 |
| 2022/0166613 | A1 | 5/2022 | Cruz et al. |
| 2024/0337829 | A1* | 10/2024 | Marquez .................... G02F 3/00 |
| 2025/0028221 | A1* | 1/2025 | Marquez .................... G02F 3/00 |
| 2025/0028222 | A1* | 1/2025 | Marquez .................... G02F 3/00 |

OTHER PUBLICATIONS

Chen, H., et al., "100-Gbps RZ Data Reception in 67-GHz Si-Contacted Germanium Waveguide p-i-n Photodetectors," Journal of Lightwave Technology, vol. 35, No. 4, pp. 722-726, Feb. 15, 2017, doi: 10.1109/JLT.2016.2593942.

Green, W., et al., "Ultra-compact, low RF power, 10 GB/s silicon Mach-Zehnder modulator," Optics Express, vol. 15, No. 25, 2007, pp. 17106-17113.

International Search Report and Written Opinion, Patent Cooperation Treaty Application No. PCT/CA2022/051712, dated Feb. 15, 2023, 8 pages.

International Search Report and Written Opinion, Patent Cooperation Treaty Application No. PCT/CA2022/051713, dated Feb. 23, 2023, 9 pages.

Kumar, A., et al., "All-optical NOT and AND gates based on 2D nonlinear photonic crystal ring resonant cavity," Optik, vol. 167, Aug. 2018, pp. 164-169.

Mohebzadeh-Bahabady, A., et al., "Proposal of a Cascade Photonic Crystal XOR Logic Gate for Optical Integrated Circuits with Investigation of Fabrication Error and Optical Power Changes," Photonics 2021, vol. 8, Article 392, 13 pages.

Mostafa, T.S., et al., "Ultra-High bit rate all-optical AND/OR logic gates based on photonic crystal with multi-wavelength simultaneous operation," Journal of Modern Optics, 2019, vol. 66, Issue 9, pp. 1005-1016.

Tait, A. N., "Quantifying power use in silicon photonic neural networks," arXiv preprint arXiv:2108.04819, 2021, pp. 1-28.

Timurdogan, E., et al., "An ultralow power athermal silicon modulator," Nature Communications, vol. 5, Article No. 4008, 2014, pp. 1-11.

Xiao, X., et al., "60 Gbit/s Silicon Modulators with Enhanced Electro-optical Efficiency," in Optical Fiber Communication Conference/National Fiber Optic Engineers Conference 2013, OSA Technical Digest (online) (Optical Society of America, 2013), paper OW4J.3, 3 pages.

Xu, Q., et al., "Silicon microring resonators with 1.5-μm radius," Optics Express, vol. 16, No. 6, 2008, pp. 4309-4315.

Caulfield, H.J., et al., "Why future supercomputing requires optics," Nature Photonics, vol. 4, Jan. 2010, pp. 261-263.

Miller, D., "Are optical transistors the logical next step?" Nature Photonics, vol. 4, Jan. 2010, pp. 3-5.

Miller, D., "The role of optics in computing," Nature Photonics, vol. 4, Jan. 2010, p. 406.

Tucker, R.S., "The role of optics in computing," Nature Photonics, vol. 4, Jan. 2010, p. 405.

\* cited by examiner

CASCADABLE PHOTONIC CIRCUITS WITH NONLINEAR AMPLITUDE THRESHOLDERS

TECHNICAL FIELD

The present disclosure generally relates to a processor architecture and, more specifically, to cascadable photonic circuits with nonlinear amplitude thresholders.

BACKGROUND

Photonic hardware is favorable for applications requiring high bandwidth, low latency, and low switching energy for signal processing, data communications, and information processing (i.e., computing). Recent innovations in silicon photonic fabrication have enabled the on-chip implementation of photonic circuits. This has opened a low-cost, high-precision, and scalable avenue for the development of photonic computing. Advances in photonic computing have demonstrated suitability for applications requiring high-bandwidth parallel processing, especially neural networks, offering higher speed and less energy consumption than equivalent networks implemented in digital or analog electronics.

Circuitry for photonic computing typically employs cascaded photonic gates. Different phases of optical signals (i.e., light signals) processed by a photonic gate can cause amplitude errors and/or phase errors at an output of the photonic gate. Furthermore, these amplitude errors and/or phase errors can propagate and accumulate through photonic circuitry that includes cascaded photonic gates.

SUMMARY

Embodiments of the present disclosure are directed to the implementation of a photonic circuit that utilizes at least one nonlinear amplitude thresholder for the correction of amplitude errors and/or phase errors produced by photonic logic. Nonlinear amplitude thresholders can be implemented with a variety of approaches (all-optical, electro-optical, or optoelectronic) in integrated or free-space, and variants or combinations thereof, including but not limited to resonator-based devices or circuits, saturable absorbers including based on graphene, Molybdenum disulfide (MoS2) or other 2D materials, carbon nanotubes, dyes, unpumped gain media, saturable semiconductor cavity laser mirrors (generally referred to as semiconductor saturable absorber mirrors, SESAMs), semiconductor absorbers (e.g., quantum dots, semiconductor optical amplifiers (SOAs), ion-implanted, reverse-biased or unpumped semiconductors, etc.), or artificial saturable absorbers (e.g., Kerr lensing devices, nonlinear polarization rotation devices, fiber loop mirrors, etc.).

The photonic circuit presented herein comprises one or more photonic input gates, a first set of one or more photonic gates coupled to the one or more photonic input gates, at least one nonlinear amplitude thresholder coupled to the first set of one or more photonic gates, and a second set of one or more photonic gates coupled to the at least one nonlinear amplitude thresholder. The one or more photonic input gates are configured to receive one or more photonic input signals and generate one or more photonic signals based on the one or more photonic input signals. The first set of one or more photonic gates is configured to generate one or more intermediate photonic output signals based on the generated one or more photonic signals. The at least one nonlinear amplitude thresholder is configured to generate at least one photonic thresholding signal based on at least one of the one or more intermediate photonic output signals, the at least one nonlinear amplitude thresholder operating in at least one of a first operating regime, a second operating regime, and a third operating regime. The second set of one or more photonic gates is configured to generate one or more photonic output signals based at least in part on the at least one photonic thresholding signal.

Embodiments of the present disclosure are further directed to a non-transitory computer-readable storage medium comprising stored instructions that, when executed by at least one processor, cause the at least one processor to: instruct one or more photonic input gates of a photonic circuit to receive one or more photonic input signals and generate one or more photonic signals based on the one or more photonic input signals; instruct a first set of one or more photonic gates of the photonic circuit coupled to the one or more photonic input gates to generate one or more intermediate photonic output signals based on the generated one or more photonic signals; instruct at least one nonlinear amplitude thresholder of the photonic circuit coupled to the first set of one or more photonic gates to generate at least one photonic thresholding signal based on at least one of the one or more intermediate photonic output signals, the at least one nonlinear amplitude thresholder operating in at least one of a first operating regime, a second operating regime, and a third operating regime; and instruct a second set of one or more photonic gates of the photonic circuit coupled to the at least one nonlinear amplitude thresholder to generate one or more photonic output signals based at least in part on the at least one photonic thresholding signal. The non-transitory computer-readable storage medium can be a digital storage medium, an analog storage medium, an optical storage medium, some other type of storage medium, or some combination thereof. The at least one processor can be an optical processor, an electronic processor (e.g., central processing unit (CPU) processor, machine learning (ML) processor, graphics processing unit (GPU) processor), some other type of processor, or some combination thereof.

Embodiments of the present disclosure are further directed to a method for operating a photonic circuit that utilizes at least one nonlinear amplitude thresholder for correction of amplitude errors and/or phase errors produced by photonic logic. The method comprises: receiving, at one or more photonic input gates of a photonic circuit, one or more photonic input signals; generating, by the one or more photonic input gates, one or more photonic signals based on the one or more photonic input signals; generating, by a first set of one or more photonic gates of the photonic circuit coupled to the one or more photonic input gates, one or more intermediate photonic output signals based on the generated one or more photonic signal; generating, by at least one nonlinear amplitude thresholder of the photonic circuit coupled to the first set of one or more photonic gates, at least one photonic thresholding signal based on at least one of the one or more intermediate photonic output signals, the at least one nonlinear amplitude thresholder operating in at least one of a first operating regime, a second operating regime, and a third operating regime; and generating, by a second set of one or more photonic gates of the photonic circuit coupled to the at least one nonlinear amplitude thresholder, one or more photonic output signals based at least in part on the at least one photonic thresholding signal.

The figures depict embodiments of the present disclosure for purposes of illustration only. One skilled in the art will readily recognize from the following description that alternative embodiments of the structures and methods illustrated herein can be employed without departing from the principles or benefits touted by the disclosure described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that can be employed without departing from the principles of what is claimed.

Reference will now be made in detail to several embodiments, examples of which are illustrated in the accompanying figures. It is noted that wherever practicable, similar or like reference numbers can be used in the figures and can indicate similar or like functionality. The figures depict embodiments of the disclosed system (or method) for illustration only. One skilled in the art will readily recognize from the following description that alternative embodiments of the structures and methods illustrated herein can be employed without departing from the principles described herein.

Embodiments of the present disclosure are directed to the implementation of a cascadable photonic circuit (i.e., photonic logic gate) that utilizes at least one passive or active nonlinear amplitude thresholder to correct errors (e.g., amplitude errors and/or phase errors) produced by a passive and/or active linear photonic logic within the photonic circuit. A photonic logic gate (e.g., exclusive 'OR' (XOR) photonic gate) presented herein utilizes at least one nonlinear amplitude thresholder as nonlinear photonic component(s) for correcting amplitude errors and/or phase errors produced by the passive and/or active linear photonic logic. A cascadable XOR photonic gate presented in this disclosure is implemented by utilizing photonic beam splitters, photonic combiners, phase demultiplexers, phase shifters, bias signals, attenuators, amplifiers, and one or more nonlinear amplitude thresholders that can operate in one or more operating regimes. The XOR photonic gate presented herein produces correct output results without any errors and can be directly cascaded with other photonic gates within a photonic processor.

Cascadable Photonic Circuits with Nonlinear Components

Figure 1A:
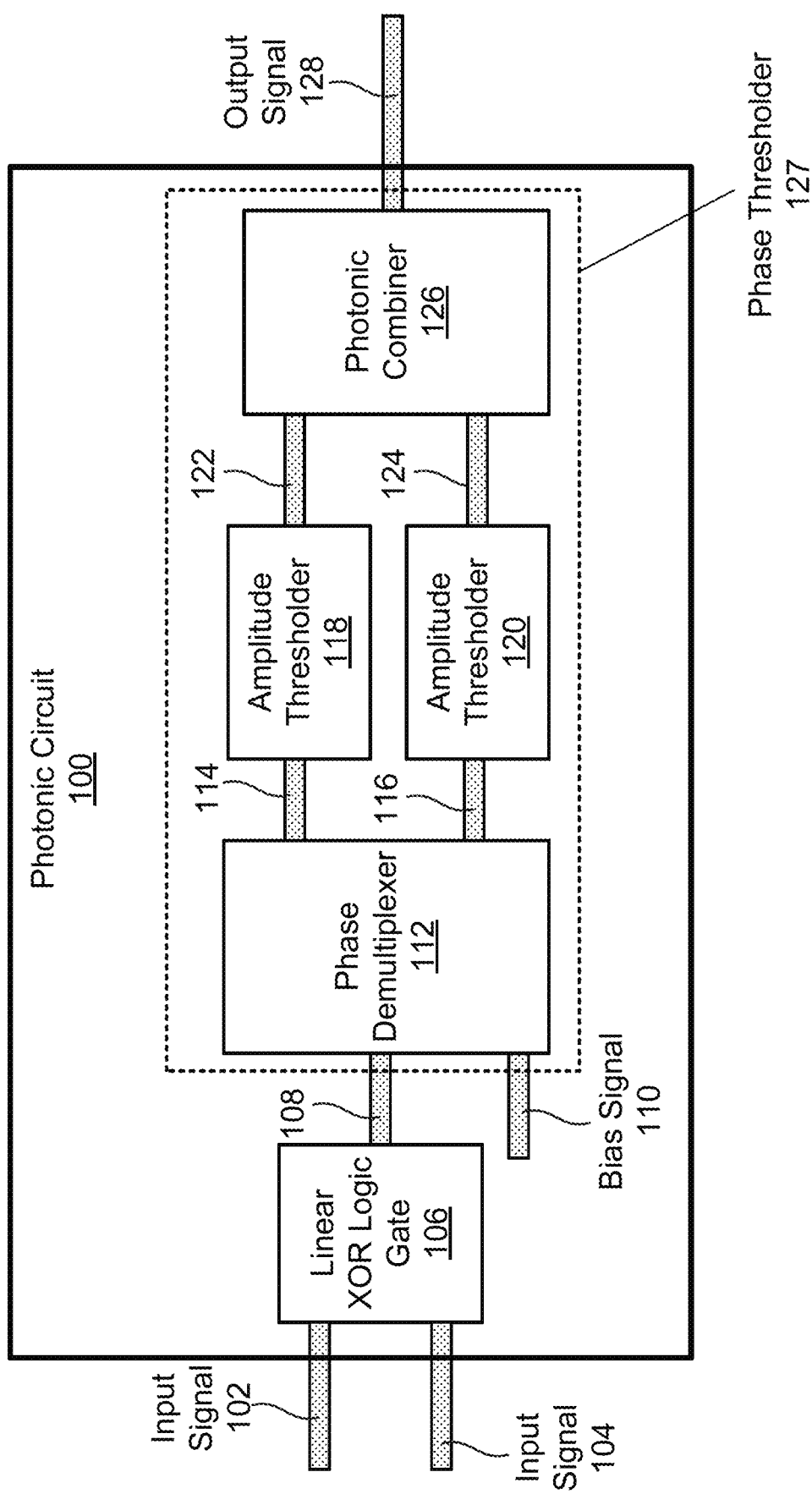
FIG. 1A illustrates an example cascadable photonic circuit that includes at least a pair of nonlinear amplitude thresholders, in accordance with some embodiments.

Figure (FIG.) 1A illustrates an example cascadable photonic circuit 100 that includes at least a pair of nonlinear amplitude thresholders, in accordance with some embodiments. The photonic circuit 100 may include a linear exclusive 'OR' (XOR) logic gate 106, a phase demultiplexer 112 connected to an output port of the linear XOR logic gate 106, an amplitude thresholder 118 connected to a first output port of the phase demultiplexer 112, an amplitude thresholder 120 connected to a second output port of the phase demultiplexer 112, and a photonic combiner 126 connected to an output port of the amplitude thresholder 118 and an output port of the amplitude thresholder 120. The phase demultiplexer 112, the amplitude thresholder 118, the amplitude thresholder 120, and the photonic combiner 126 may be part of a nonlinear phase thresholder 127. The photonic circuit 100 may generate a photonic output signal 128 as a logical function of photonic input signals 102, 104 (and, optionally, one or more additional photonic input signals). The photonic circuit 100 may be configured to operate as a nonlinear XOR photonic gate. Alternatively, or additionally, the photonic circuit 100 may be configured to operate as some other nonlinear photonic logic gate. The photonic circuit 100 may include fewer or additional components not shown in FIG. 1A, such as, but not limited to, phase shifters for compensation of fabrication variations, linear photonic amplifiers, and/or photonic attenuators.

The linear XOR logic gate 106 may receive a pair of photonic input signals 102, 104 and generate a photonic signal 108 as an XOR function of the photonic input signals 102 and 104. Since the linear XOR logic gate 106 includes a linear photonic logic, the photonic signal 108 may include one or more errors (e.g., amplitude errors and/or phase errors) that would be corrected by other components of the photonic circuit 100. The photonic input signals 102, 104 may be light signals of corresponding input amplitudes (that each corresponds to logical "1" or logical "0"), corresponding input phases and/or corresponding input modes (i.e., input light spatial distribution and/or input wavelengths) injected into a set of input ports of the linear XOR logic gate 106. The photonic input signals 102, 104 may be generated by an array of lasers (not shown in FIG. 1A). The array of lasers may be instructed (i.e., triggered) by at least one processor (e.g., optical processor, electronic processor, electro-optical processor, etc.) coupled to the array of lasers to generate the photonic input signals 102, 104 of specific amplitudes, phases, modes (or wavelengths). The set of input ports of the linear XOR logic gate 106 may represent, e.g., a set of waveguides, a set of waveguide polarizations, a set of waveguide modes, a set of light wavelengths, etc. The photonic signal 108 may be a light signal of corresponding output amplitudes (that each corresponds to logical "1" or logical "0"), corresponding output phases and/or corresponding output modes (i.e., output light spatial distribution and/or output wavelength) detected at an output port of the linear XOR logic gate 106. The output port of the linear XOR logic gate 106 may represent, e.g., a waveguide, a waveguide polarization, a waveguide mode, a light wavelength, a signal radiated by the linear XOR logic gate 106, etc. The photonic signal 108 generated by the linear XOR logic gate 106 may be passed to the phase demultiplexer 112 of the phase thresholder 127.

The phase demultiplexer 112 may receive the photonic signal 108 at a first input port of the phase demultiplexer 112. Additionally, the phase demultiplexer 112 may receive a bias signal 110 at a second input port of the phase demultiplexer 112. The set of input ports of the phase demultiplexer 112 may represent, e.g., a set of waveguides, a set of waveguide polarizations, a set of waveguide modes, a set of light wavelengths, etc. The bias signal 110 that is input to the phase demultiplexer 112 is a light signal of a defined amplitude level that is constant over time. The bias signal 110 may be generated by, e.g., a photonic local oscillator coupled to the second input port of the phase demultiplexer 112 (not shown in FIG. 1A).

The phase demultiplexer 112 is a linear photonic circuit that demultiplexes (i.e., copies) the received photonic signal 108 into a first intermediate photonic output signal 114 and a second intermediate photonic output signal 116, while also applying an amplitude of the bias signal 110. Amplitudes of the first intermediate photonic output signal 114 and the second intermediate photonic output signal 116 may depend on a relative phase between the received photonic signal 108 and the bias signal 110. Furthermore, the phase demultiplexer 112 may shift a phase of the second intermediate photonic output signal 116 (e.g., by $\pi$ radians) relative to a phase of the photonic signal 108 and a phase of the first intermediate photonic output signal 114. The phase demultiplexer 112 can be also referred to as a "180-degree hybrid circuit" as the phase demultiplexer 112 performs both demultiplexing and phase shifting (e.g., by 180 degrees). The phase demultiplexer 112 may pass the first intermediate photonic output signal 114 to the amplitude thresholder 118 of the phase thresholder 127 and the second intermediate photonic output signal 116 to the amplitude thresholder 120 of the phase thresholder 127.

The amplitude thresholder 118 may receive the first intermediate photonic output signal 114 at an input port of the amplitude thresholder 118. The input port of the amplitude thresholder 118 may represent, e.g., a waveguide, a waveguide polarization, a waveguide mode, a light wavelength, etc. The amplitude thresholder 118 may be a nonlinear photonic component that generates a photonic signal 122 by processing each amplitude of the received first intermediate photonic output signal 114 while operating in a first region of a transfer function of the amplitude thresholder 118 associated with a first operating regime (e.g., a region 165 in FIG. 1C), in a second region of the transfer function associated with a second operating regime (e.g., a region 167 in FIG. 1C), or in a third region of the transfer function associated with a third operating regime (e.g., a region 170 in FIG. 1C). An operating regime of the amplitude thresholder 118 may depend on a level of each amplitude of the first intermediate photonic output signal 114 that is input to the amplitude thresholder 118. The amplitude thresholder 118 may be silicon-based, e.g., made of silicon or silicon nitride, or made of some other non-silicon material. The amplitude thresholder 118 may saturate an amplitude of the first intermediate photonic output signal 114 to a first amplitude level, when the amplitude thresholder 118 operates in the first region. The amplitude thresholder 118 may process an amplitude of the first intermediate photonic output signal 114 by applying a transfer gain of the second region to generate an amplitude of the photonic signal 122, when the amplitude thresholder 118 operates in the second region. And, the amplitude thresholder 118 may saturate an amplitude of the first intermediate photonic output signal 114 to a second amplitude level, when the amplitude thresholder 118 operates in the third region.

Alternatively, the amplitude thresholder 118 may be implemented as a nonlinear optical saturable absorber that absorbs incoming light with amplitudes above a threshold level and outputs light having a sequence of thresholded amplitudes. The nonlinear optical saturable absorber may be implemented as, e.g., a saturable absorber including based on graphene, Molybdenum disulfide (MoS2) or other 2D materials, carbon nanotube, dye, unpumped gain medium, saturable semiconductor cavity laser mirror (generally referred to as a semiconductor saturable absorber mirror, SESAM), semiconductor absorber (e.g., quantum dot, semiconductor optical amplifier (SOA), ion-implanted, reverse-biased or unpumped semiconductor, etc.), or artificial saturable absorber (e.g., Kerr lensing device, nonlinear polarization rotation device, fiber loop mirror, etc.). The amplitude thresholder 118 implemented as the nonlinear optical saturable absorber may generate the photonic signal 122 by saturating (i.e., absorbing) an amplitude of the first intermediate photonic output signal 114 to a threshold amplitude level (e.g., approximately equal to zero) when operating in a first region of a transfer function of the amplitude thresholder 118 implemented as the nonlinear optical saturable absorber, which can be referred to as a first operating regime of the amplitude thresholder 118. Alternatively, the amplitude thresholder 118 implemented as the nonlinear optical saturable absorber may generate the photonic signal 122 by substantially propagating an amplitude of the first intermediate photonic output signal 114 when operating in a second region of the transfer function, which can be referred to as a second operating regime of the amplitude thresholder 118. An operating regime of the amplitude thresholder 118 implemented as the nonlinear optical saturable absorber may depend on the amplitude of the first intermediate photonic output signal 114.

Figure 5A:
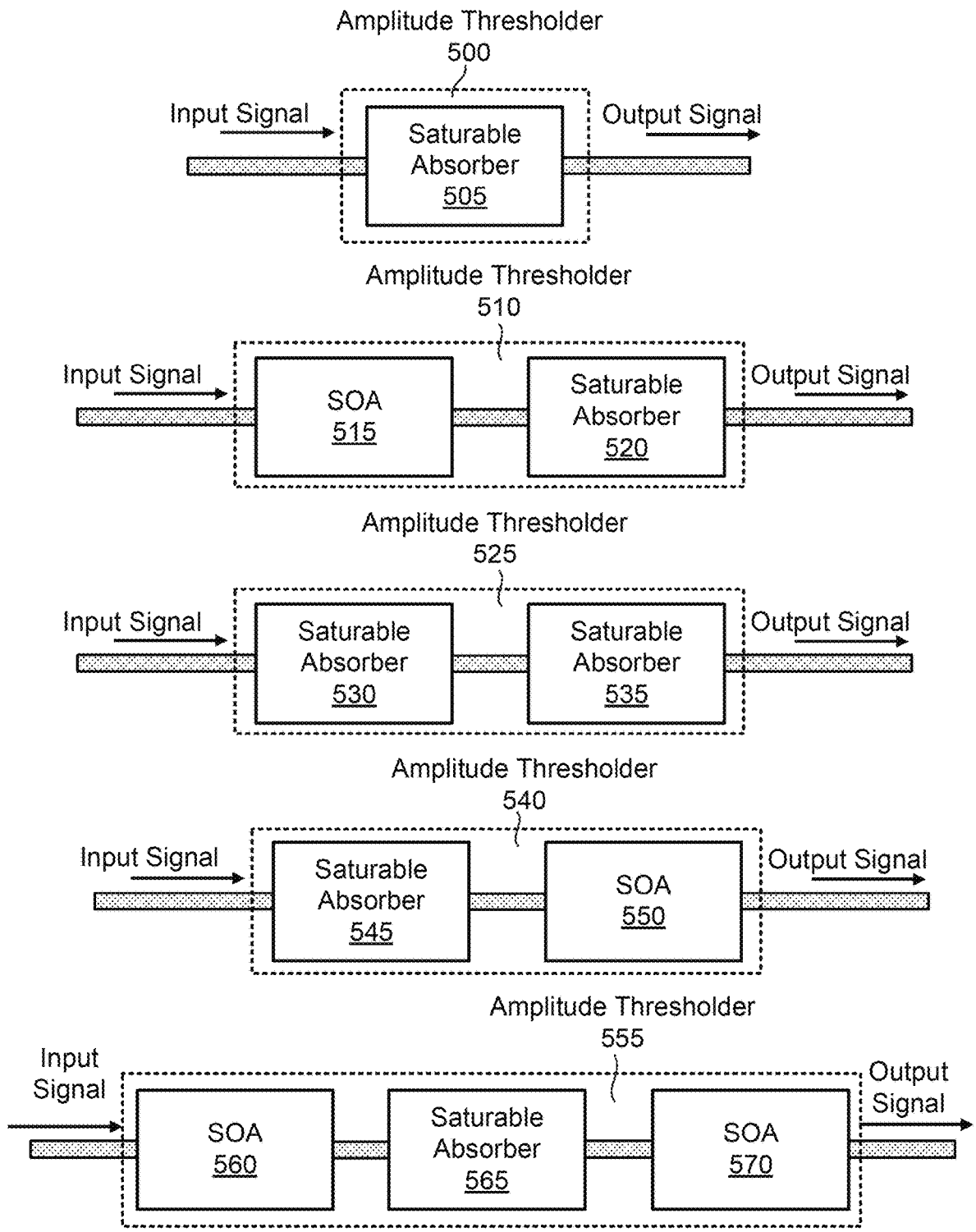
FIG. 5A illustrates examples of different configurations of a nonlinear amplitude thresholder, in accordance with some embodiments.

Alternatively, the amplitude thresholder 118 may be implemented as a SOA-based amplitude thresholder. In such a case, the amplitude thresholder 118 may operate as a nonlinear active photonic amplifier that generates the photonic signal 122 by saturating an amplitude of the first intermediate photonic output signal 114 to a defined amplitude level (e.g., above zero amplitude level) while being configured to operate in a first region of a transfer function of the SOA-based amplitude thresholder. Or the amplitude thresholder 118 implemented as the SOA-based amplitude thresholder may operate in a second region of the transfer function and generate the photonic signal 122 by applying a gain of the second region to an amplitude of the first intermediate photonic output signal 114. The amplitude thresholder 118 implemented as the SOA-based amplitude thresholder may operate in the first region or in the second region depending on an amplitude level of the first intermediate photonic output signal 114. Alternatively, the amplitude thresholder 118 may be implemented as some other photonic thresholding device. Alternatively, the amplitude thresholder 118 may include a cascading connection of one or more saturable absorbers and one or more SOA-based amplitude thresholders (e.g., as shown in FIG. 5A). The photonic signal 122 generated by the amplitude thresholder 118 may be output at an output port of the amplitude thresholder 118. The output port of the amplitude thresholder 118 may represent, e.g., a waveguide, a waveguide polarization, a waveguide mode, a light wavelength, a signal radiated by the amplitude thresholder 118, etc. The amplitude thresholder 118 may pass the photonic signal 122 to the photonic combiner 126 of the phase thresholder 127.

The amplitude thresholder 120 may receive the second intermediate photonic output signal 116 at an input port of the amplitude thresholder 120. The input port of the amplitude thresholder 120 may represent, e.g., a waveguide, a waveguide polarization, a waveguide mode, a light wavelength, etc. The amplitude thresholder 120 may be a nonlinear photonic component that generates a photonic signal 124 by processing each amplitude of the received second intermediate photonic output signal 116 while operating in a first region of a transfer function of the amplitude thresholder 120 associated with a first operating regime (e.g., the region 165), in a second region of the transfer function associated with a second operating regime (e.g., the region 167), or in a third region of the transfer function associated with a third operating regime (e.g., the region 170). An operating regime of the amplitude thresholder 120 may depend on a level of each amplitude of the second intermediate photonic output signal 116 that is input to the amplitude thresholder 120. The amplitude thresholder 120 may be silicon-based, e.g., made of silicon or silicon nitride, or made of some other non-silicon material. The amplitude thresholder 120 may saturate an amplitude of the second intermediate photonic output signal 116 to a first amplitude level, when the amplitude thresholder 120 operates in the first region. The amplitude thresholder 120 may process an amplitude of the second intermediate photonic output signal 116 by applying a transfer gain of the second region to generate an amplitude of the photonic signal 124, when the amplitude thresholder 120 operates in the second region. And, the amplitude thresholder 120 may saturate an amplitude of the second intermediate photonic output signal 116 to a second amplitude level, when the amplitude thresholder 120 operates in the third region.

Alternatively, the amplitude thresholder 120 may be implemented as the nonlinear optical saturable absorber. The amplitude thresholder 120 implemented as the nonlinear optical saturable absorber may generate the photonic signal 124 by saturating (i.e., absorbing) an amplitude of the second intermediate photonic output signal 116 to a threshold amplitude level (e.g., approximately equal to zero) when operating in a first region of a transfer function of the amplitude thresholder 120 implemented as the nonlinear optical saturable absorber, which can be referred to as a first operating regime of the amplitude thresholder 120. Alternatively, the amplitude thresholder 120 implemented as the nonlinear optical saturable absorber may generate the photonic signal 124 by substantially propagating an amplitude of the second intermediate photonic output signal 116 when operating in a second region of the transfer function, which can be referred to as a second operating regime of the amplitude thresholder 120. An operating regime of the amplitude thresholder 120 implemented as the nonlinear optical saturable absorber may depend on the amplitude of the first intermediate photonic output signal 114.

Alternatively, the amplitude thresholder 120 may be implemented as a SOA-based amplitude thresholder. In such a case, the amplitude thresholder 120 may operate as a nonlinear active photonic amplifier that generates the photonic signal 124 by saturating an amplitude of the second intermediate photonic output signal 116 to a defined amplitude level (e.g., above zero amplitude level) while being configured to operate in a first region of a transfer function of the SOA-based amplitude thresholder. Or the amplitude thresholder 120 implemented as the SOA-based amplitude thresholder may operate in a second region of the transfer function and generate the photonic signal 124 by applying a gain of the second region to an amplitude of the second intermediate photonic output signal 116. The amplitude thresholder 120 implemented as the SOA-based amplitude thresholder may operate in the first region or in the second region depending on an amplitude level of the second intermediate photonic output signal 116. Alternatively, the amplitude thresholder 120 may be implemented as some other photonic thresholding device. Alternatively, the amplitude thresholder 120 may include a cascading connection of one or more saturable absorbers and one or more SOA-based amplitude thresholders (e.g., as shown in FIG. 5A). The photonic signal 124 generated by the amplitude thresholder 120 may be output at an output port of the amplitude thresholder 120. The output port of the amplitude thresholder 120 may represent, e.g., a waveguide, a waveguide polarization, a waveguide mode, a light wavelength, a signal radiated by the amplitude thresholder 120, etc. The amplitude thresholder 120 may pass the photonic signal 124 to the photonic combiner 126.

The photonic combiner 126 may receive, at its first input port, the photonic signal 122 generated by the amplitude thresholder 118. The photonic combiner 126 may further receive, at its second input port, the photonic signal 124 generated by the amplitude thresholder 120. The set of input ports of the photonic combiner 126 may represent, e.g., a set of waveguides, a set of waveguide polarizations, a set of waveguide modes, a set of light wavelengths, etc. The photonic combiner 126 may generate a photonic output signal 128 by combining the photonic signal 122 and the photonic signal 124. Thus, the photonic combiner 126 operates as a linear OR photonic logic gate. Note that the phase demultiplexer 112, the amplitude thresholders 118, 120 and the photonic combiner 126 may form the nonlinear phase thresholder 127 as these linear and nonlinear photonic components effectively adjust a phase and amplitude of the photonic signal 108 generated by the linear XOR logic gate 106 that represents input to the nonlinear phase thresholder 127.

The photonic output signal 128 may be output at an output port of the photonic combiner 126. The output port of the photonic combiner 126 is an output of the phase thresholder 127. The output port of the photonic combiner 126 may represent, e.g., a waveguide, a waveguide polarization, a waveguide mode, a light wavelength, a signal radiated by the photonic combiner 126, etc. The output port of the photonic combiner 126 may also represent an output port of the photonic circuit 100. In some embodiments, the photonic output signal 128 represents a resulting light signal of the XOR logic operation of the photonic input signal 102 and the photonic input signal 104. Hence, in such cases, the photonic circuit 100 operates as a nonlinear XOR photonic logic gate. Since the photonic output signal 128 together with the photonic input signals 102 and 104 form an accurate truth table of an XOR photonic logic gate (i.e., no errors are propagated to the output port of the photonic circuit 100), the photonic circuit 100 is cascadable, i.e., the photonic circuit 100 can be directly connected with other (same or different) photonic circuits within a photonic processor.

Figure 1B:
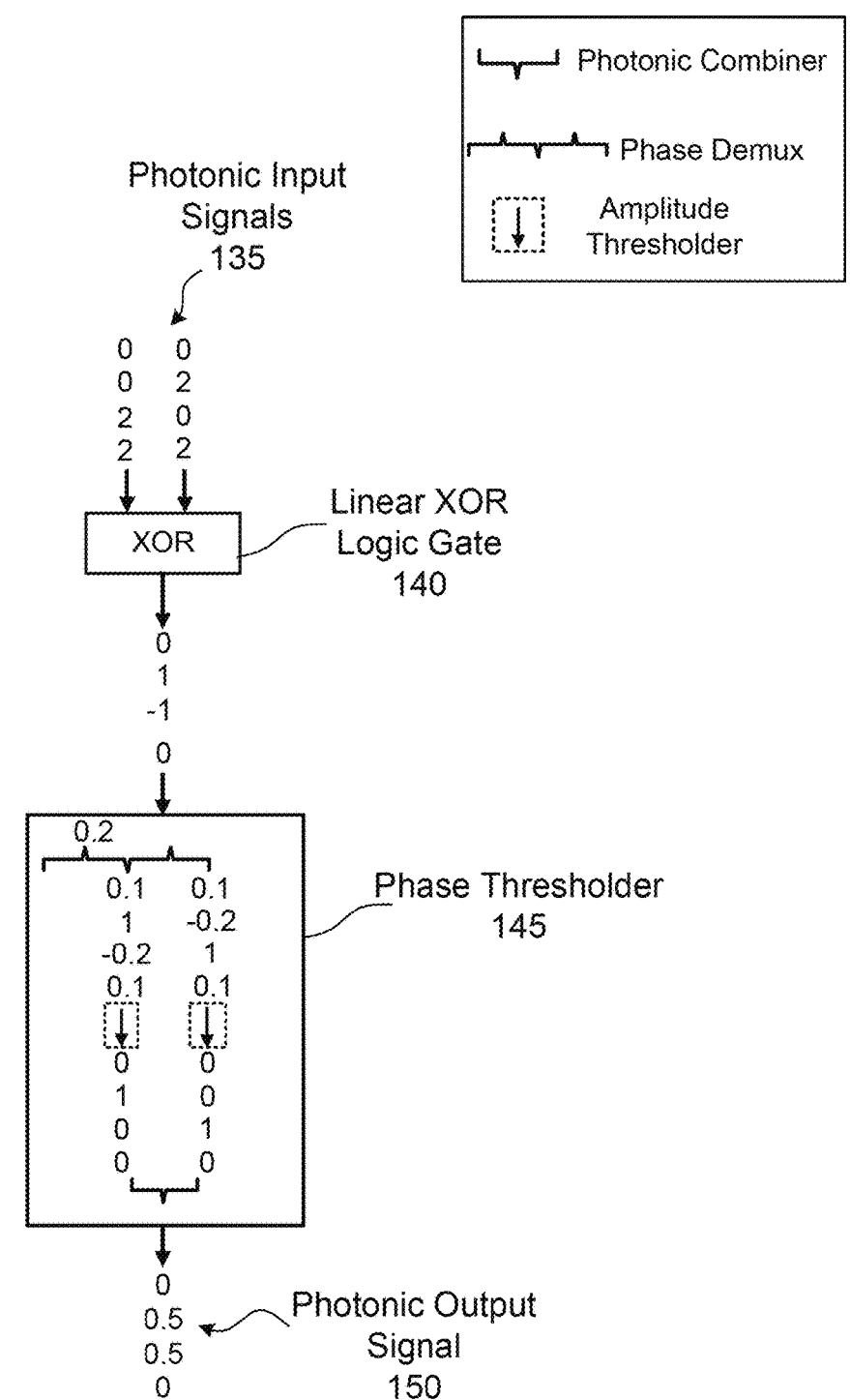
FIG. 1B illustrates an example XOR logic operation of the cascadable photonic circuit in FIG. 1A, in accordance with some embodiments.

FIG. 1B illustrates an example XOR logic operation of the photonic circuit 100, in accordance with some embodiments. A nonlinear XOR photonic gate 130 shown in FIG. 1B represents an embodiment of the photonic circuit 100. The nonlinear XOR photonic gate 130 receives a pair of photonic input signals 135, A and B. The photonic input signals 135, A and B, may be light signals of corresponding input amplitudes (that each corresponds to logical "1" or logical "0"), corresponding input phases and/or corresponding input modes (i.e., input light spatial distribution and/or input wavelengths) injected into a set of input ports of a linear XOR logic gate 140 of the nonlinear XOR photonic gate 130. The linear XOR logic gate 140 may be an embodiment of the linear XOR logic gate 106. For example, the photonic input signal A has a variable amplitude over time characterized by the amplitude sequence of "0 0 2 2" that corresponds to the logical sequence of "0 0 1 1"; and the photonic input signal B has a variable amplitude over time characterized by the amplitude sequence of "0 2 0 2" that corresponds to the logical sequence of "0 1 0 1". The photonic input signals 135, A and B, may represent examples of the photonic input signals 102 and 104.

After inputting the photonic input signals 135, A and B, the linear XOR logic gate 140 may generate a photonic signal having the amplitude sequence of "0 1 −1 0" as the XOR logic function of the photonic input signals A and B, where the amplitude of "1" represent a lower amplitude level relative to the amplitude of "2" but a higher amplitude level relative to the amplitude of "0". Since the linear XOR logic gate 140 includes only linear photonic gates, there is an erroneous amplitude "−1" in the generated photonic signal that needs to be corrected. The erroneous amplitude "−1" may represent an erroneously inverted version (e.g., erroneously phase-shifted version) of an amplitude "1". The photonic signal having the amplitude sequence of "0 1 −1 0" generated by the linear XOR logic gate 140 may be passed to a phase thresholder 145 of the nonlinear XOR photonic gate 130. The phase thresholder 145 may be an embodiment of the phase thresholder 127.

The photonic signal having the amplitude sequence of "0 1 −1 0" may be first input into a phase demultiplexer of the phase thresholder 145 (e.g., an embodiment of the phase demultiplexer 112). A bias signal having a constant amplitude of 0.2 (e.g., an embodiment of the bias signal 110) may be also input into the phase demultiplexer of the phase thresholder 145. The phase demultiplexer of the phase thresholder 145 may demultiplex the photonic signal having the amplitude sequence of "0 1 −1 0" and apply the bias signal with the constant amplitude of 0.2 to generate a first photonic signal having the amplitude sequence of "0.1 1 −0.2 0.1" and a second photonic signal having the amplitude sequence of "0.1 −0.2 1 0.1". Note that the amplitude level of "0.1" corresponds to an amplitude level that is higher than the amplitude level of "0" but lower than the amplitude level of "0.2"; and the amplitude level of "−0.2" refers to the amplitude level of "0.2", while having a shifted phase relative to the amplitude level of "0.2" by π radians.

Figure 1C:
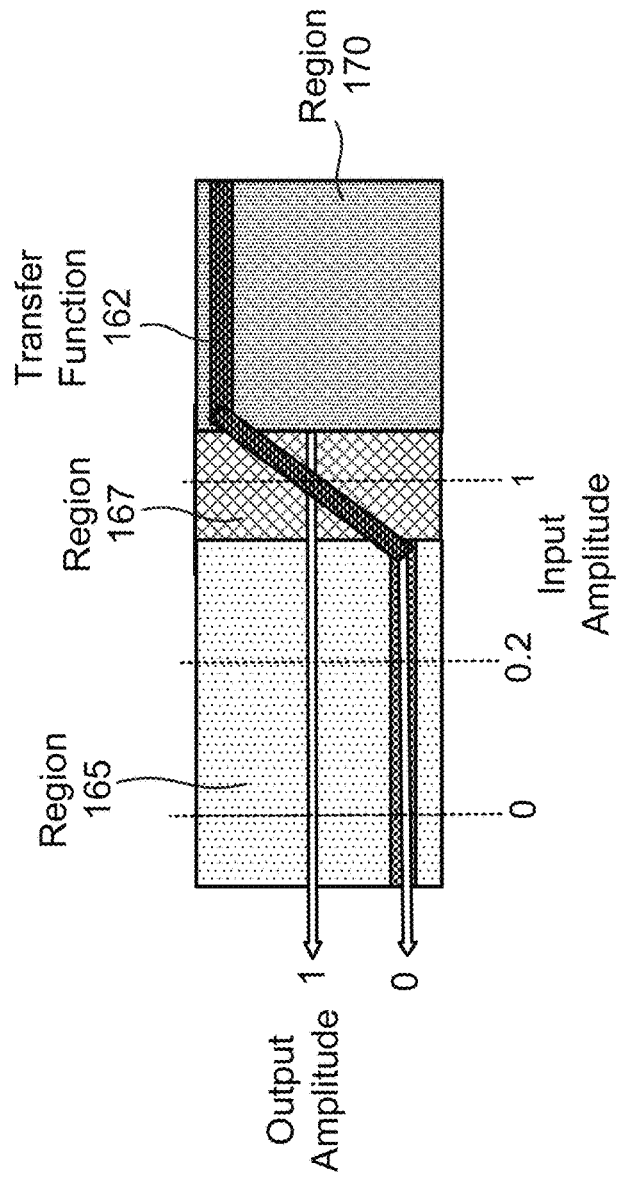
FIG. 1C illustrates an example model of a nonlinear amplitude thresholder of the photonic circuit in FIG. 1A, in accordance with some embodiments.

The first photonic signal having the amplitude sequence of "0.1 1 −0.2 0.1" and the second photonic signal having the amplitude sequence of "0.1 −0.2 1 0.1" may be passed to nonlinear amplitude thresholders of the phase thresholder 145 (e.g., embodiments of the amplitude thresholders 118 and 120). FIG. 1C illustrates an example model 160 of the nonlinear amplitude thresholders applied within the nonlinear XOR photonic gate 130, in accordance with some embodiments. A first nonlinear amplitude thresholder of the phase thresholder 145 (e.g., an embodiment of the amplitude thresholder 118) may be a nonlinear optical component that generates a first photonic thresholding signal having the amplitude sequence of "0 1 0 0" based on the first photonic signal having the amplitude sequence of "0.1 1 −0.2 0.1". The first nonlinear amplitude thresholder has a nonlinear transfer function 162 and may operate in the region 165, the region 167, or the region 170 depending on the amplitude of the first photonic signal input into the first nonlinear amplitude thresholder. When the amplitude of the first photonic signal is "0.1" or "−0.2" (e.g., less than or equal to "0.2" in absolute values), the first nonlinear amplitude thresholder may operate in the region 165 and output the first photonic thresholding signal having the saturated amplitude of "0". And, when the amplitude of the first photonic signal is "1", the first nonlinear amplitude thresholder may operate in the region 167 and output the first photonic thresholding signal having the amplitude of "1", which is a non-saturated amplitude value and depends on a transfer gain (i.e., slope of the transfer function 162) in the region 167.

A second nonlinear amplitude thresholder of the phase thresholder 145 (e.g., an embodiment of the amplitude thresholder 120) may be a nonlinear optical component that generates a second photonic thresholding signal having the amplitude sequence of "0 0 1 0" based on the second photonic signal having the amplitude sequence of "0.1 −0.2 1 0.1". The second nonlinear amplitude thresholder has the transfer function 162 and may operate in the region 165, the region 167, or the region 170 depending on the amplitude of the second photonic signal input into the second nonlinear amplitude thresholder. When the amplitude of the second photonic signal is "0.1" or "−0.2" (e.g., less than or equal to "0.2" in absolute values), the second nonlinear amplitude thresholder may operate in the region 165 and output the second photonic thresholding signal having the saturated amplitude of "0". And, when the amplitude of the second photonic signal is "1", the second nonlinear amplitude thresholder may operate in the region 167 and output the second photonic thresholding signal having the amplitude of "1", which is a non-saturated amplitude value. The first and second nonlinear amplitude thresholders may pass the first and second photonic thresholding signals to a photonic combiner of the phase thresholder 145 (e.g., an embodiment of the photonic combiner 126).

The photonic combiner of the phase thresholder 145 may combine the first photonic thresholding signal having the amplitude sequence of "0 1 0 0" with the second thresholding signal having the amplitude sequence of "0 0 1 0" to generate a photonic output signal 150 with the amplitude sequence of "0 0.5 0.5 0". As the amplitude level of "0" corresponds to the "low" logic value and the amplitude level of "0.5" corresponds to the "high" logic value, the photonic output signal 150 represents a correct result of the XOR logical operation between the photonic input signal A and the photonic input signal B. The photonic output signal 150 having the amplitude sequence of "0 0.5 0.5 0" may be an example of the photonic output signal 128. It should be understood that example parameters of the nonlinear XOR photonic gate 130 shown in FIG. 1B and FIG. 1C (e.g., the amplitude value of the bias signal, and parameters of the thresholder model 160) represent one possible embodiment of the photonic circuit 100, and that other example parameters are possible that result in the XOR logical operation or some other logical operation of the photonic circuit 100.

Figure 2A:
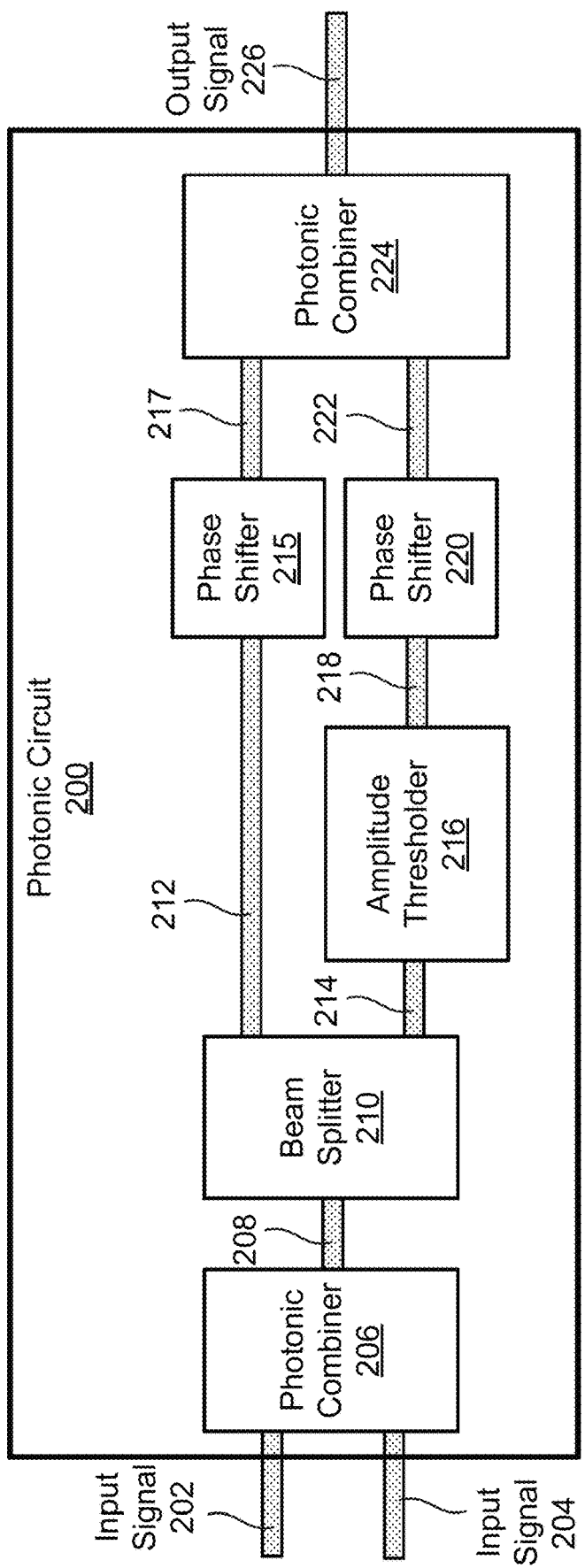
FIG. 2A illustrates an example cascadable photonic circuit that includes at least one nonlinear amplitude thresholder, in accordance with some embodiments.

FIG. 2A illustrates an example cascadable photonic circuit 200 that includes at least one nonlinear amplitude thresholder, in accordance with some embodiments. The photonic circuit 200 may include a photonic combiner 206, a beam splitter 210 connected to an output port of the photonic combiner 206, a phase shifter 215 connected to a first output port of the beam splitter 210, an amplitude thresholder 216 connected to a second output port of the beam splitter 210, a phase shifter 220 connected to an output port of the amplitude thresholder 216, and a photonic combiner 224 connected to an output port of the phase shifter 215 and an output port of the phase shifter 220. The photonic circuit 200 may generate a photonic output signal 226 as a logical function of photonic input signals 202, 204 (and, optionally, one or more additional photonic input signals). The photonic circuit 200 may be configured to operate as a nonlinear XOR photonic gate. Alternatively, or additionally, the photonic circuit 200 may be configured to operate as some other nonlinear photonic logic gate. The photonic circuit 200 may include fewer or additional components not shown in FIG. 2A, such as, but not limited to, additional phase shifters for compensation of fabrication variations, linear photonic amplifiers, and/or photonic attenuators.

The photonic combiner 206 may receive a pair of photonic input signals 202, 204 and generate a photonic signal 208 that represents a logical combination of the photonic input signals 202 and 204. Thus, the photonic combiner 206 operates as a linear OR photonic logic gate. The photonic input signals 202, 204 may be light signals of corresponding input amplitudes (that each corresponds to logical "1" or logical "0"), corresponding input phases and/or corresponding input modes (i.e., input light spatial distribution and/or input wavelengths) injected into a set of input ports of the photonic combiner 206. The photonic input signals 202, 204 may be generated by an array of lasers (not shown in FIG. 2A). The array of lasers may be instructed (i.e., triggered) by at least one processor (e.g., optical processor, electronic processor, electro-optical processor, etc.) coupled to the array of lasers to generate the photonic input signals 202, 204 of specific amplitudes, phases and/or modes (or wavelengths). The set of input ports of the photonic combiner 206 may represent, e.g., a set of waveguides, a set of waveguide polarizations, a set of waveguide modes, a set of light wavelengths, etc. The photonic signal 208 may be a light signal of corresponding output amplitudes (that each corresponds to logical "1" or logical "0"), corresponding output phase and/or corresponding output mode (i.e., output light spatial distribution and/or output wavelength) detected at an output port of the photonic combiner 206. The output port of the photonic combiner 206 may represent, e.g., a waveguide, a waveguide polarization, a waveguide mode, a light wavelength, a signal radiated by the photonic combiner 206, etc. The photonic combiner 206 may pass the photonic signal 208 to the beam splitter 210.

The beam splitter 210 may receive the photonic signal 208 at its input port. The input port of the beam splitter 210 may represent, e.g., a waveguide, a waveguide polarization, a waveguide mode, a light wavelength, etc. The beam splitter 210 is a linear photonic component that splits the received photonic signal 208 into two photonic signals 212, 214. Each photonic signal 212, 214 may be output at a respective output port of the beam splitter 210. A set of output ports of the beam splitter 210 may represent, e.g., a set of waveguides, a set of waveguide polarizations, a set of waveguide modes, a set of light wavelengths, signals radiated by the beam splitter 210, etc. The photonic signals 212 and 214 produced by the beam splitter 210 may be passed to the phase shifter 215 and the amplitude thresholder 216, respectively.

The phase shifter 215 may receive the photonic signal 212 at its input port. The input port of the phase shifter 215 may represent, e.g., a waveguide, a waveguide polarization, a waveguide mode, a light wavelength, etc. The phase shifter 215 is a linear photonic component that generates a photonic signal 217 by shifting a phase of the received photonic signal 212. For example, the phase shifter 215 may apply a phase shift of $\pi$ radians to the photonic signal 212, i.e., the photonic signal 217 may represent an inverted version of the photonic signal 212. The photonic signal 217 may be output at an output port of the phase shifter 215. The output port of the phase shifter 215 may represent, e.g., a waveguide, a waveguide polarization, a waveguide mode, a light wavelength, a signal radiated by the phase shifter 215, etc. The photonic signal 217 generated by the phase shifter 215 may be passed to the photonic combiner 224.

The amplitude thresholder 216 may receive the photonic signal 214 at an input port of the amplitude thresholder 216. The input port of the amplitude thresholder 216 may represent, e.g., a waveguide, a waveguide polarization, a waveguide mode, a light wavelength, etc. The amplitude thresholder 216 may be a nonlinear photonic component that generates a photonic signal 218 by processing each amplitude of the received photonic signal 214 while operating in a first region of a transfer function of the amplitude thresholder 216 associated with a first operating regime (e.g., a region 255 in FIG. 2C and a region 285 in FIG. 2E), in a second region of the transfer function associated with a second operating regime (e.g., a region 257 in FIG. 2C and a region 287 in FIG. 2E), or in a third region of the transfer function associated with a third operating regime (e.g., a region 260 in FIG. 2C and a region 290 in FIG. 2E). An operating regime of the amplitude thresholder 216 may depend on a level of each amplitude of the photonic signal 214 that is input to the amplitude thresholder 216. The amplitude thresholder 216 may be silicon-based, e.g., made of silicon or silicon nitride, or made of some other non-silicon material. The amplitude thresholder 216 may saturate an amplitude of the photonic signal 214 to a first amplitude level, when the amplitude thresholder 216 operates in the first region. The amplitude thresholder 216 may process an amplitude of the photonic signal 214 by applying a transfer gain of the second region to generate an amplitude of the photonic signal 218, when the amplitude thresholder 216 operates in the second region. And, the amplitude thresholder 216 may saturate an amplitude of the photonic signal 214 to a second amplitude level, when the amplitude thresholder 216 operates in the third region.

Alternatively, the amplitude thresholder 216 may be implemented as the nonlinear optical saturable absorber. The amplitude thresholder 216 implemented as the nonlinear optical saturable absorber may generate the photonic signal 218 by saturating (i.e., absorbing) an amplitude of the photonic signal 214 to a threshold amplitude level (e.g., approximately equal to zero) when operating in a first region of a transfer function of the amplitude thresholder 216 implemented as the nonlinear optical saturable absorber, which can be referred to as a first operating regime of the amplitude thresholder 216. Alternatively, the amplitude thresholder 216 implemented as the nonlinear optical saturable absorber may generate the photonic signal 218 by substantially propagating an amplitude of the photonic signal 214 when operating in a second region of the transfer function, which can be referred to as a second operating regime of the amplitude thresholder 216. An operating regime of the amplitude thresholder 216 implemented as the nonlinear optical saturable absorber may depend on the amplitude of the photonic signal 214. Since the amplitude thresholder 216 operating as the nonlinear optical saturable absorber may attenuate an amplitude of the photonic signal 214 when generating the photonic signal 218, one or more amplitudes of the photonic signal 218 may be substantially lower than one or more corresponding amplitudes of the photonic signal 212, which is not suitable for combining the photonic signals 212 and 218 (e.g., at the photonic combiner 224 after phase-shifting). To ensure that power levels of the photonic signals 212 and 218 are at desired levels, a variable optical attenuator or a SOA operating in a linear region (e.g., the region 257 or the region 287) may be included into each arm of the photonic circuit 200 (e.g., at both output ports of the beam splitter 210, or at the first output port of the beam splitter 210 and at the output port of the amplitude thresholder 216).

Alternatively, the amplitude thresholder 216 may be implemented as a SOA-based amplitude thresholder. In such a case, the amplitude thresholder 216 may operate as a nonlinear active photonic amplifier that generates the photonic signal 218 by saturating an amplitude of the photonic signal 214 to a defined amplitude level (e.g., above zero amplitude level) while being configured to operate in a first region of a transfer function of the SOA-based amplitude thresholder. Or the amplitude thresholder 216 implemented as the SOA-based amplitude thresholder may operate in a second region of the transfer function and generate the photonic signal 218 by applying a gain of the second region to an amplitude of the photonic signal 214. The amplitude thresholder 216 implemented as the SOA-based amplitude thresholder may operate in the first region or in the second region depending on an amplitude level of the photonic signal 214. Alternatively, the amplitude thresholder 216 may be implemented as some other photonic thresholding device. Alternatively, the amplitude thresholder 216 may include a cascading connection of one or more saturable absorbers and one or more SOA-based amplitude thresholders (e.g., as shown in FIG. 5A).

The photonic signal 218 generated by the amplitude thresholder 216 may be output at an output port of the amplitude thresholder 216. The output port of the amplitude thresholder 216 may represent, e.g., a waveguide, a waveguide polarization, a waveguide mode, a light wavelength, a signal radiated by the amplitude thresholder 216, etc. The amplitude thresholder 216 may pass the photonic signal 218 to the phase shifter 220.

The phase shifter 220 may receive the photonic signal 218 at its input port. The input port of the phase shifter 220 may represent, e.g., a waveguide, a waveguide polarization, a waveguide mode, a light wavelength, etc. The phase shifter 220 is a linear photonic component that generates a photonic signal 222 by shifting a phase of the received photonic signal 218. For example, the phase shifter 220 may apply a phase shift of $\pi$ radians to the photonic signal 218, i.e., the photonic signal 222 may represent an inverted version of the photonic signal 218. The photonic signal 222 may be output at an output port of the phase shifter 220. The output port of the phase shifter 220 may represent, e.g., a waveguide, a waveguide polarization, a waveguide mode, a light wavelength, a signal radiated by the phase shifter 220, etc. The photonic signal 222 generated by the phase shifter 220 may be passed to the photonic combiner 224.

The photonic combiner 224 may receive, at its first input port, the photonic signal 217 generated by the phase shifter 215. The photonic combiner 224 may further receive, at its second input port, the photonic signal 222 generated by the phase shifter 220. The set of input ports of the photonic combiner 224 may represent, e.g., a set of waveguides, a set of waveguide polarizations, a set of waveguide modes, a set of light wavelengths, etc. The photonic combiner 224 may generate the photonic output signal 226 by combining the photonic signal 217 and the photonic signal 222. Thus, the photonic combiner 224 operates as a linear OR photonic logic gate. The photonic output signal 226 may be output at an output port of the photonic combiner 224. The output port of the photonic combiner 224 may represent, e.g., a waveguide, a waveguide polarization, a waveguide mode, a light wavelength, a signal radiated by the photonic combiner 224, etc. The output port of the photonic combiner 224 may also represent an output port of the photonic circuit 200. In some embodiments, the photonic output signal 226 represents a resulting light signal of the XOR logic operation of the photonic input signal 202 and the photonic input signal 204. Hence, in such cases, the photonic circuit 200 operates as a nonlinear XOR photonic logic gate. Since the photonic output signal 226 together with the photonic input signals 202 and 204 form an accurate truth table of an XOR photonic logic gate (i.e., no errors are propagated to the output port of the photonic circuit 200), the photonic circuit 200 is cascadable, i.e., the photonic circuit 200 can be directly connected with other (same or different) photonic circuits within a photonic processor.

Figure 2B:
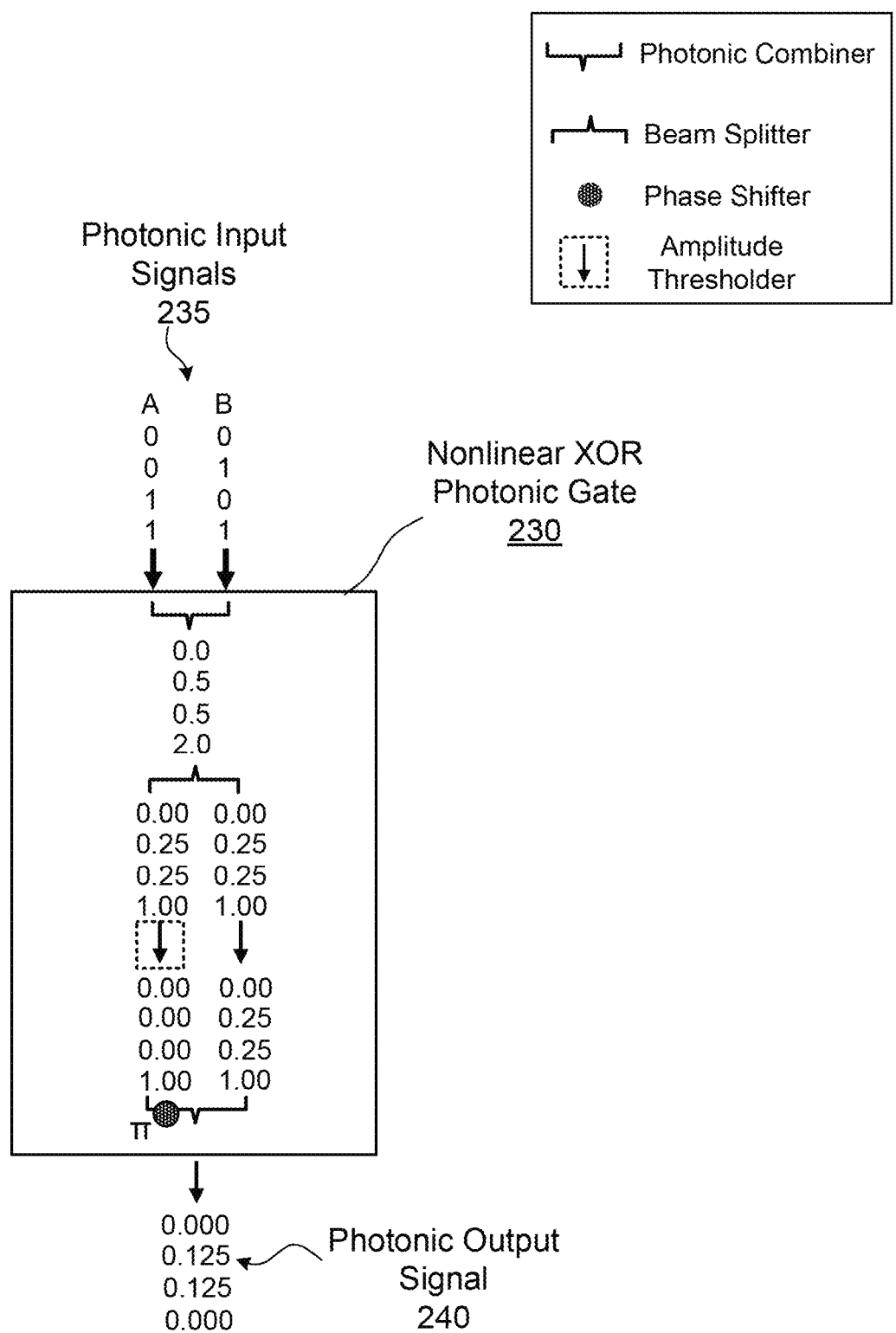
FIG. 2B illustrates an example XOR logic operation of the cascadable photonic circuit in FIG. 2A, in accordance with some embodiments.

FIG. 2B illustrates an example XOR logic operation of the photonic circuit 200, in accordance with some embodiments. A nonlinear XOR photonic gate 230 shown in FIG. 2B may be an embodiment of the photonic circuit 200. The nonlinear XOR photonic gate 230 receives a pair of photonic input signals 235, A and B. The photonic input signals 235, A and B, may be light signals of corresponding input amplitudes (that each corresponds to logical "1" or logical "0"), corresponding input phases and/or corresponding input modes (i.e., input light spatial distribution and/or input wavelengths) injected into a set of input ports of the nonlinear XOR photonic gate 230. For example, the photonic input signal A has a variable amplitude over time having the amplitude sequence of "0 0 1 1"; and the photonic input signal B has a variable amplitude over time having the amplitude sequence of "0 1 0 1". The photonic input signals 235, A and B, may represent examples of the photonic input signals 202 and 204.

The photonic input signals 235, A and B, may be input into a first photonic combiner of the nonlinear XOR photonic gate 230 (e.g., an embodiment of the photonic combiner 206). The first photonic combiner of the nonlinear XOR photonic gate 230 may combine the first photonic input signal A with the photonic input signal B to generate a combined photonic signal having the amplitude sequence of "0.0 0.5 0.5 2.0". Note that the amplitude level of "2.0" in the combined photonic signal refers to a "third amplitude level", which is higher relative to other two amplitude levels of "0" and "1". Also, the amplitude level of "0.5" in the combined photonic signal corresponds to an amplitude level that is higher relative to the amplitude level of "0", but lower relative to the amplitude level of "1".

The combined photonic signal having the amplitude sequence of "0.0 0.5 0.5 2.0" may be passed onto a beam splitter of the nonlinear XOR photonic gate 230 (e.g., an embodiment of the beam splitter 210). The beam splitter of the nonlinear XOR photonic gate 230 may split the amplitude sequence of "0.0 0.5 0.5 2.0" into a pair of photonic signals each having the amplitude sequence of "0.00 0.25 0.25 1.00". Note that the amplitude level of "0.25" corresponds to an amplitude level that is higher than the amplitude level of "0" but lower than the amplitude level of "0.5". A first photonic signal having the amplitude sequence of "0.00 0.25 0.25 1.00" may be passed to a nonlinear amplitude thresholder of the nonlinear XOR photonic gate 230 (e.g., an embodiment of the amplitude thresholder 216). A second photonic signal having the amplitude sequence of "0.00 0.25 0.25 1.00" may be passed to a second photonic combiner of the nonlinear XOR photonic gate 230 (e.g., an embodiment of the photonic combiner 224).

Figure 2C:
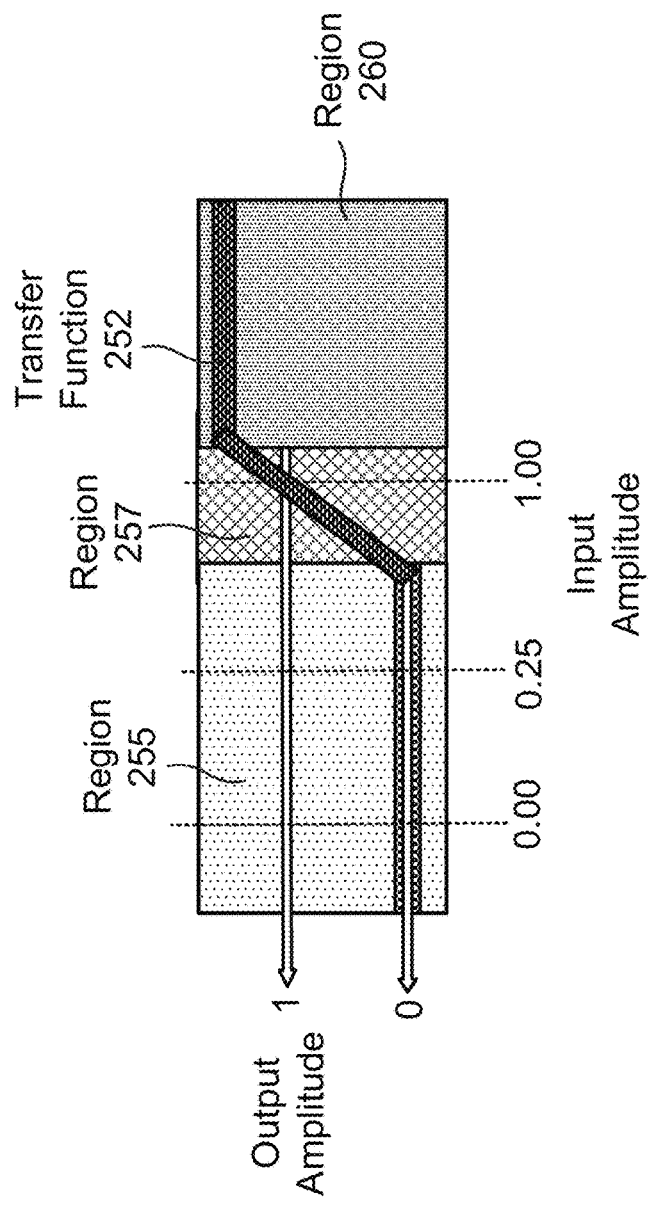
FIG. 2C illustrates an example model of a nonlinear amplitude thresholder of the photonic circuit in FIG. 2A using intensity signals, in accordance with some embodiments.

FIG. 2C illustrates an example model 250 of the nonlinear amplitude thresholder applied within the nonlinear XOR photonic gate 230 using intensity signals, in accordance with some embodiments. The nonlinear amplitude thresholder of the nonlinear XOR photonic gate 230 (e.g., an embodiment of the amplitude thresholder 216) may be a nonlinear optical component that generates a photonic thresholding signal having the amplitude sequence of "0.00 0.00 0.00 1.00" based on the first photonic signal having the amplitude sequence of "0.00 0.25 0.25 1.00". The nonlinear amplitude thresholder has a nonlinear transfer function 252 and may operate in the region 255, the region 257, or the region 260 depending on the amplitude of the first photonic signal input into the nonlinear amplitude thresholder. In some embodiments, the regions 255 and 260 are approximately nonlinear regions of the transfer function 252, and the region 260 is approximately linear region of the transfer function 252. When the amplitude of the first photonic signal is "0.00" or "0.25" (e.g., less than or equal to "0.25"), the nonlinear amplitude thresholder may operate in the region 255 and output the photonic thresholding signal having the saturated amplitude of "0" (or, equivalently, "0.00"). And, when the amplitude of the first photonic signal is "1.00", the nonlinear amplitude thresholder may operate in the region 257 and output the photonic thresholding signal having the amplitude of "1" (or, equivalently, "1.00"), which is a non-saturated amplitude value and depends on a transfer gain (i.e., a slope of the transfer function 252) in the region 257 (e.g., the transfer gain of 1).

Referring back to FIG. 2B, the nonlinear amplitude thresholder may pass the photonic thresholding signal having the amplitude sequence of "0.00 0.00 0.00 1.00" to a phase shifter of the nonlinear XOR photonic gate 230 (e.g., an embodiment of the phase shifter 220). The phase shifter of the nonlinear XOR photonic gate 230 may perform phase shifting of the photonic thresholding signal having the amplitude sequence of "0.00 0.00 0.00 1.00" (e.g., by π radians) to effectively invert the photonic thresholding signal. An inverted version of the photonic thresholding signal having the amplitude sequence of "0.00 0.00 0.00-1.00" may be passed onto the second photonic combiner of the nonlinear XOR photonic gate 230. Note that the amplitude level of "−1.00" refers to the amplitude level of "1.00", while having a shifted phase relative to the amplitude level of "1.00" by π radians.

The second photonic combiner of the nonlinear XOR photonic gate 230 may combine the phase-shifted version of the photonic thresholding signal having the amplitude sequence of "0.00 0.00 0.00-1.00" with the second photonic signal having the amplitude sequence of "0.00 0.25 0.25 1.00" to generate a photonic output signal 240 having the amplitude sequence of "0.000 0.125 0.125 0.000". Note that the amplitude value of "0.125" may correspond to an amplitude level lower than the amplitude level of "0.25" but higher than the amplitude level of "0". As the amplitude level of "0.000" in the photonic output signal 240 corresponds to the "low" logic value and the amplitude level of "0.125" in the photonic output signal 240 corresponds to the "high" logic value, the photonic output signal 240 represents a correct result of the XOR logical operation between the photonic input signal A and the photonic input signal B. The photonic output signal 240 having the amplitude sequence of "0.000 0.125 0.125 0.000" may be an example of the photonic output signal 226. It should be understood that example parameters of the nonlinear XOR photonic gate 230 shown in FIG. 2B and FIG. 2C (e.g., parameters of the thresholder model 250) represent one possible embodiment of the photonic circuit 200, and that other example parameters are possible that result in the XOR logical operation or some other logical operation of the photonic circuit 200.

The general mathematical model for the nonlinear XOR photonic gate 230 can be derived using the notion of electric fields. The photonic input signal A can be defined as a sequence of electric field strengths over time, $E_1^1, E_1^2, E_1^3, E_1^4$; and the photonic input signal B can be defined as a sequence of electric field strengths over time, $E_2^1, E_2^2, E_2^3, E_2^4$, where $\{E_1^3, E_1^4, E_2^2, E_2^4\} > \{E_1^1, E_1^2, E_2^1, E_2^3\}$, and, ideally, $E_1^1 = E_2^1 = 0$. Furthermore, conditions that may be enforced are: $E_1^3 = E_1^4 = E_2^2 = E_2^4$ and $E_1^1 = E_1^2 = E_2^1 = E_2^3$. The first photonic combiner of the nonlinear XOR photonic gate 230 generates a combined photonic signal having a sequence of electric field strengths $$\frac{E_1^1 + E_2^1}{\sqrt{2}}, \frac{E_1^2 + E_2^2}{\sqrt{2}}, \frac{E_1^3 + E_2^3}{\sqrt{2}}, \frac{E_1^4 + E_2^4}{\sqrt{2}}$$

by combining the photonic input signal A and the photonic input signal B. The beam splitter of the nonlinear XOR photonic gate 230 splits the combined photonic signal into a pair of photonic signals, each having a sequence of electric field strengths $$\frac{E_1^1 + E_2^1}{2}, \frac{E_1^2 + E_2^2}{2}, \frac{E_1^3 + E_2^3}{2}, \frac{E_1^4 + E_2^4}{2}.$$

A first photonic signal generated by the beam splitter and having the sequence of electric field strengths $$\frac{E_1^1 + E_2^1}{2}, \frac{E_1^2 + E_2^2}{2}, \frac{E_1^3 + E_2^3}{2}, \frac{E_1^4 + E_2^4}{2}$$

is then passed to the second photonic combiner of the nonlinear XOR photonic gate 230. A second photonic signal generated by the beam splitter and having the sequence of electric field strengths $$\frac{E_1^1+E_2^1}{2}, \frac{E_1^2+E_2^2}{2}, \frac{E_1^3+E_2^3}{2}, \frac{E_1^4+E_2^4}{2}$$

is processed by at least one amplitude thresholder of the nonlinear XOR photonic gate 230 that has a saturated output strength of electric field equal to $$\frac{E_1^2+E_2^1}{2}$$

when operating in, e.g., the region 255. The at least one amplitude thresholder of the nonlinear XOR photonic gate 230 may output the photonic thresholding signal having a sequence of electric field strengths $$G\left(\frac{E_1^1+E_2^1}{2}\right), G\left(\frac{E_1^2+E_2^2}{2}\right), G\left(\frac{E_1^3+E_2^3}{2}\right), G\left(\frac{E_1^4+E_2^4}{2}\right),$$

where G is a gain of the at least one amplitude thresholder.

The photonic thresholding signal having the sequence of electric field strengths $$G\left(\frac{E_1^1+E_2^1}{2}\right), G\left(\frac{E_1^1+E_2^1}{2}\right), G\left(\frac{E_1^1+E_2^1}{2}\right), G\left(\frac{E_1^4+E_2^4}{2}\right)$$

is phase-shifted by π radians before being input into the second photonic combiner of the nonlinear XOR photonic gate 230. The second photonic combiner combines the phase-shifted version of the photonic thresholding signal with the first photonic signal generated by the beam splitter to obtain the photonic output signal having an ideal sequence of electric field strengths 0, $$\frac{E_1^2+E_2^2}{2\sqrt{2}}, \frac{E_1^3+E_2^3}{2\sqrt{2}}, 0,$$

where the electric field intensities $$\left|\frac{E_1^2+E_2^2}{2\sqrt{2}}\right|^2 \text{ and } \left|\frac{E_1^3+E_2^3}{2\sqrt{2}}\right|^2$$

correspond to the high logic value when G≈1. Thus, the generated photonic output signal corresponds to the XOR logic function between the photonic input signals A and B.

Figure 2D:
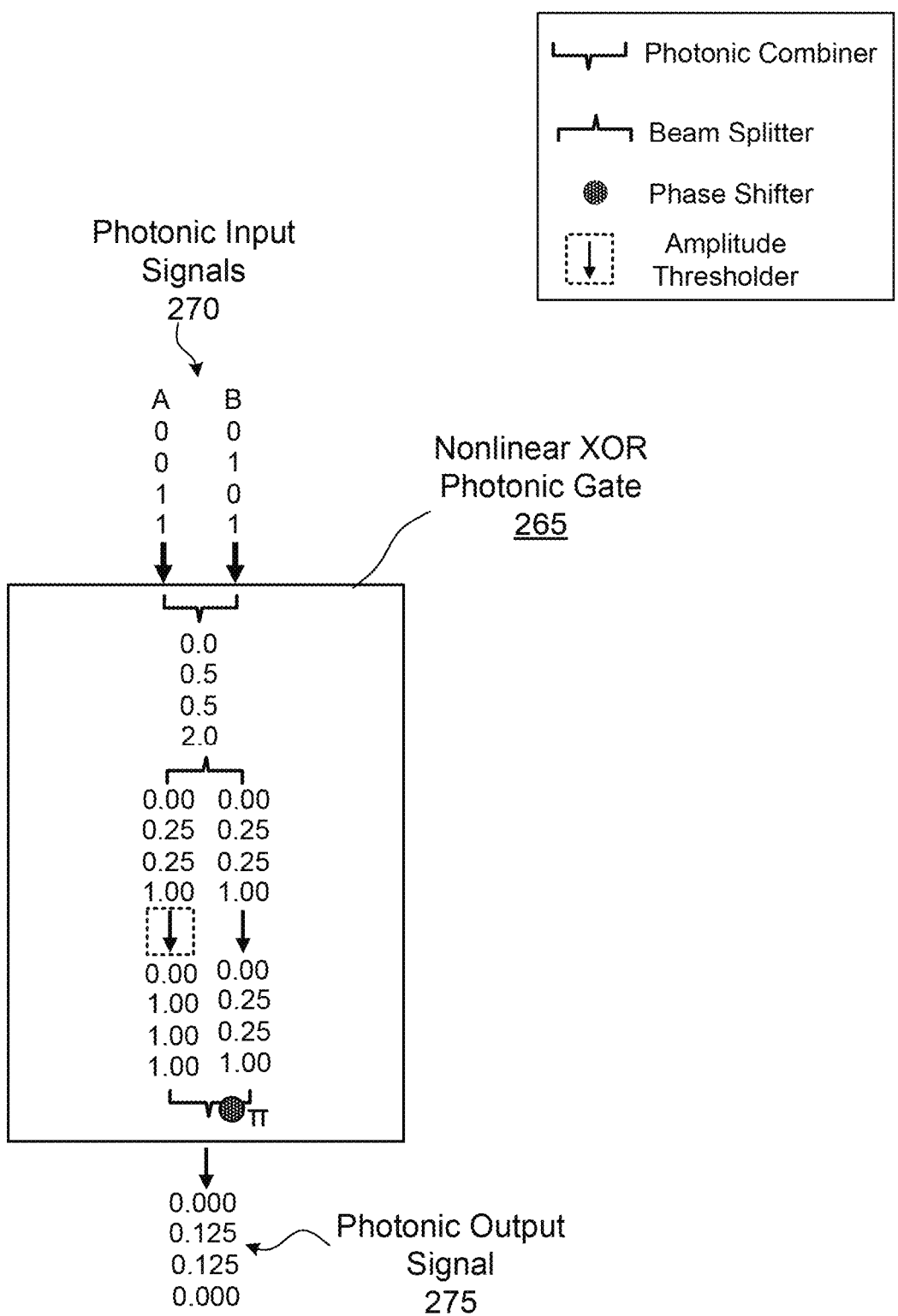
FIG. 2D illustrates another example XOR logic operation of the cascadable photonic circuit in FIG. 2A, in accordance with some embodiments.

FIG. 2D illustrates another example XOR logic operation of the photonic circuit 200, in accordance with some embodiments. A nonlinear XOR photonic gate 265 shown in FIG. 2D may be an embodiment of the photonic circuit 200. The nonlinear XOR photonic gate 265 receives a pair of photonic input signals 270, A and B. The photonic input signals 270, A and B, may be light signals of corresponding input amplitudes (that each corresponds to logical "1" or logical "0"), corresponding input phases and/or corresponding input modes (i.e., input light spatial distribution and/or input wavelengths) injected into a set of input ports of the nonlinear XOR photonic gate 265. For example, the photonic input signal A has a variable amplitude over time having the amplitude sequence of "0 0 1 1"; and the photonic input signal B has a variable amplitude over time having the amplitude sequence of "0 1 0 1. The photonic input signals 270, A and B, may represent examples of the photonic input signals 202 and 204.

The photonic input signals 270, A and B, may be input into a first photonic combiner of the nonlinear XOR photonic gate 265 (e.g., an embodiment of the photonic combiner 206). The first photonic combiner of the nonlinear XOR photonic gate 265 may combine the first photonic input signal A with the photonic input signal B to generate a combined photonic signal having the amplitude sequence of "0.0 0.5 0.5 2.0". Note that the amplitude level of "2.0" in the combined photonic signal refers to a "third amplitude level", which is higher relative to other two amplitude levels of "0" and "1". Also, the amplitude level of "0.5" in the combined photonic signal corresponds to an amplitude level that is higher relative to the amplitude level of "0", but lower relative to the amplitude level of "1".

The combined photonic signal having the amplitude sequence of "0.0 0.5 0.5 2.0" may be passed onto a beam splitter of the nonlinear XOR photonic gate 265 (e.g., an embodiment of the beam splitter 210). The beam splitter of the nonlinear XOR photonic gate 265 may split the amplitude sequence of "0.0 0.5 0.5 2.0" into a pair of photonic signals each having the amplitude sequence of "0.00 0.25 0.25 1.00". Note that the amplitude level of "0.25" corresponds to an amplitude level that is higher than the amplitude level of "0" but lower than the amplitude level of "0.5". A first photonic signal having the amplitude sequence of "0.00 0.25 0.25 1.00" may be passed to a phase shifter of the nonlinear XOR photonic gate 265 (e.g., an embodiment of the phase shifter 215). A second photonic signal having the amplitude sequence of "0.00 0.25 0.25 1.00" may be passed to a nonlinear amplitude thresholder of the nonlinear XOR photonic gate 265 (e.g., an embodiment of the amplitude thresholder 216).

Figure 2E:
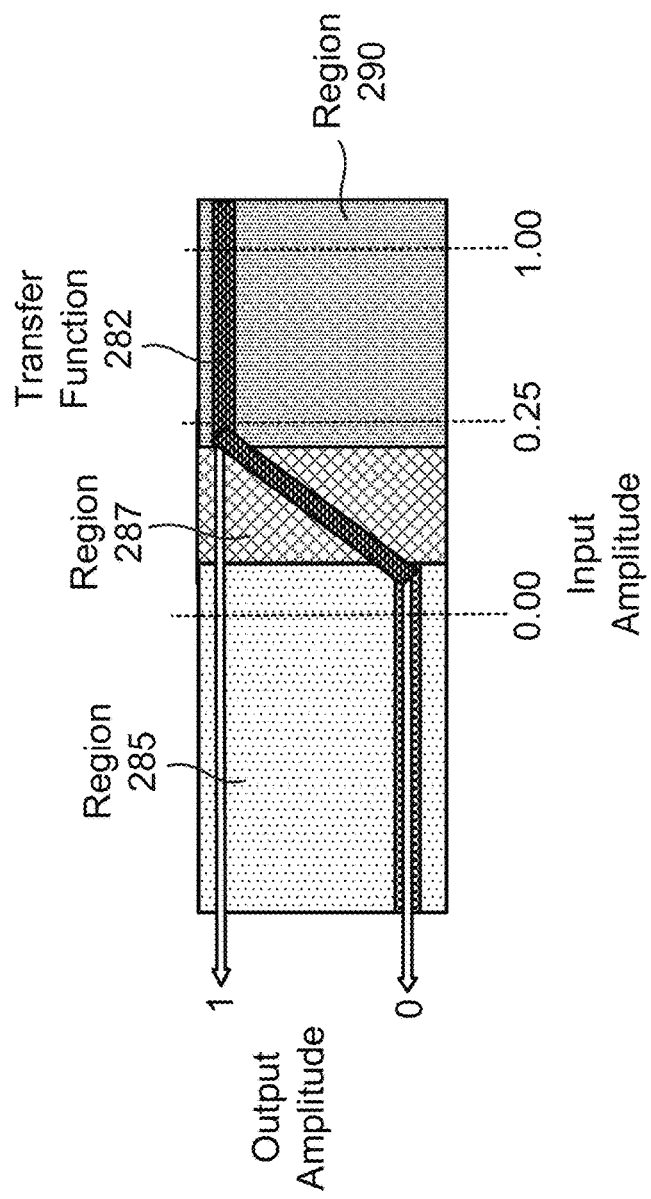
FIG. 2E illustrates another example model of a nonlinear amplitude thresholder of the photonic circuit in FIG. 2A using intensity signals, in accordance with some embodiments.

FIG. 2E illustrates an example model 280 of the nonlinear amplitude thresholder applied within the nonlinear XOR photonic gate 265 using intensity signals, in accordance with some embodiments. The nonlinear amplitude thresholder of the nonlinear XOR photonic gate 265 (e.g., an embodiment of the amplitude thresholder 216) may be a nonlinear optical component that generates a photonic thresholding signal having the amplitude sequence of "0.00 1.00 1.00 1.00" based on the second photonic signal having the amplitude sequence of "0.00 0.25 0.25 1.00". The nonlinear amplitude thresholder has a nonlinear transfer function 282 and may operate in the region 285, the region 287, or the region 290 depending on the amplitude of the second photonic signal into the nonlinear amplitude thresholder. In some embodiments, the regions 285 and 290 are approximately nonlinear regions of the transfer function 282, and the region 290 is approximately linear region of the transfer function 282. When the amplitude of the second photonic signal is "0.00", the nonlinear amplitude thresholder may operate in the region 285 and output the photonic thresholding signal having the saturated amplitude of "0" (or, equivalently, "0.00"). And, when the amplitude of the second photonic signal is "0.25" or "1.00" (e.g., equal to or greater than "0.25"), the nonlinear amplitude thresholder may operate in the region 290 and output the photonic thresholding signal having the saturated amplitude of "1" (or, equivalently, "1.00"). The nonlinear amplitude thresholder may pass the photonic thresholding signal having the amplitude sequence of "0.00 1.00 1.00 1.00" to a second photonic combiner of the nonlinear XOR photonic gate 265 (e.g., an embodiment of the photonic combiner 224).

Referring back to FIG. 2D, the phase shifter of the nonlinear XOR photonic gate 265 may perform phase shifting of the first photonic signal having the amplitude sequence of "0.00 0.25 0.25 1.00" (e.g., by π radians) to effectively invert the first photonic signal. An inverted version of the first photonic signal having the amplitude sequence of "0.00 −0.25 −0.25 −1.00" may be passed onto the second photonic combiner of the nonlinear XOR photonic gate 265. Note that the amplitude level of "−1" refers to the same amplitude level of "1" but having a shifted phase by π radians relative to the amplitude level of "1". Similarly, the amplitude level of "−0.25" refers to the same amplitude level of "0.25" but having a shifted phase by π radians relative to the amplitude level of "0.25".

The second photonic combiner of the nonlinear XOR photonic gate 265 may combine the phase-shifted version of the first photonic signal having the amplitude sequence of "0.00 −0.25 −0.25 −1.00" with the photonic thresholding signal having the amplitude sequence of "0.00 1.00 1.00 1.00" to generate a photonic output signal 275 having the amplitude sequence of "0.000 0.125 0.125 0.000". Note that the amplitude value of "0.125" may correspond to an amplitude level lower than the amplitude level of "0.25" but higher than the amplitude level of "0". As the amplitude level of "0.000" corresponds to the "low" logic value and the amplitude level of "0.125" corresponds to the "high" logic value, the photonic output signal 275 represents a correct result of the XOR logical operation between the photonic input signal A and the photonic input signal B. The photonic output signal 275 having the amplitude sequence of "0.000 0.125 0.125 0.000" may be an example of the photonic output signal 226. It should be understood that example parameters of the nonlinear XOR photonic gate 265 shown in FIG. 2D and FIG. 2E (e.g., parameters of the thresholder model 280) represent one possible embodiment of the photonic circuit 200, and that other example parameters are possible that result in the XOR logical operation or some other logical operation of the photonic circuit 200.

The general mathematical model for the nonlinear XOR photonic gate 265 can be derived using the notion of electric fields. The photonic input signal A can be defined as a sequence of electric field strengths over time, $E_1^1$, $E_1^2$, $E_1^3$, $E_1^4$; and the photonic input signal B can be defined as a sequence of electric field strengths over time, $E_2^1$, $E_2^2$, $E_2^3$, $E_2^4$, where $\{E_1^3, E_1^4, E_2^2, E_2^4\} \gg \{E_1^1, E_1^2, E_2^1, E_2^3\}$, and, ideally, $E_1^1 = E_2^1 = 0$. Furthermore, conditions that may be enforced are: $E_1^3 = E_1^4 = E_2^2 = E_2^4$ and $E_1^1 = E_1^2 = E_2^1 = E_2^3$. The first photonic combiner of the nonlinear XOR photonic gate 265 generates a combined photonic signal having a sequence of electric field strengths $$\frac{E_1^1 + E_2^1}{\sqrt{2}}, \frac{E_1^2 + E_2^2}{\sqrt{2}}, \frac{E_1^3 + E_2^3}{\sqrt{2}}, \frac{E_1^4 + E_2^4}{\sqrt{2}}$$

by combining the photonic input signal A and the photonic input signal B. The beam splitter of the nonlinear XOR photonic gate 265 splits the combined photonic signal into a pair of photonic signals, each having a sequence of electric field strengths $$\frac{E_1^1 + E_2^1}{2}, \frac{E_1^2 + E_2^2}{2}, \frac{E_1^3 + E_2^3}{2}, \frac{E_1^4 + E_2^4}{2}.$$

A first photonic signal generated by the beam splitter and having the sequence of electric field strengths $$\frac{E_1^1 + E_2^1}{2}, \frac{E_1^2 + E_2^2}{2}, \frac{E_1^3 + E_2^3}{2}, \frac{E_1^4 + E_2^4}{2}$$

is then passed to a phase shifter and the second photonic combiner of the nonlinear XOR photonic gate 265. A second photonic signal generated by the beam splitter and having the sequence of electric field strengths $$\frac{E_1^1 + E_2^1}{2}, \frac{E_1^2 + E_2^2}{2}, \frac{E_1^3 + E_2^3}{2}, \frac{E_1^4 + E_2^4}{2}$$

is processed by at least one amplitude thresholder of the nonlinear XOR photonic gate 265 that has a saturated output strength of electric field equal to $$\frac{E_1^2 + E_2^2}{2}$$

when operating in, e.g., the region 290. The at least one amplitude thresholder of the nonlinear XOR photonic gate 265 may output the photonic thresholding signal having a sequence of electric field strengths $$G\left(\frac{E_1^1 + E_2^1}{2}\right), G\left(\frac{E_1^2 + E_2^2}{2}\right), G\left(\frac{E_1^2 + E_2^2}{2}\right), G\left(\frac{E_1^2 + E_2^2}{2}\right),$$

where G is a gain of the at least one amplitude thresholder, such that G>1 and $$\frac{E_1^4 + E_2^4}{2} = G\left(\frac{E_1^2 + E_2^2}{2}\right).$$

The photonic thresholding signal is then passed to the second photonic combiner of the nonlinear XOR photonic gate 265.

The first photonic signal having the sequence of electric field strengths $$\left(\frac{E_1^1 + E_2^1}{2}, \frac{E_1^2 + E_2^2}{2}, \frac{E_1^3 + E_2^3}{2}, \frac{E_1^4 + E_2^4}{2}\right)$$

is phase-shifted by π radians before being input into the second photonic combiner of the nonlinear XOR photonic gate 265. The second photonic combiner combines the phase-shifted version of the first photonic signal with the photonic thresholding signal generated by the at least one amplitude thresholder to obtain the photonic output signal having an ideal sequence of electric field strengths 0, $$(G-1)\frac{E_1^2 + E_2^2}{2\sqrt{2}}, G\frac{E_1^2 + E_2^2}{2\sqrt{2}} - \frac{E_1^3 + E_2^3}{2\sqrt{2}}, 0,$$

where the electric field strengths $$(G-1)\frac{E_1^2 + E_2^2}{2\sqrt{2}} \text{ and } G\frac{E_1^2 + E_2^2}{2\sqrt{2}} - \frac{E_1^3 + E_2^3}{2\sqrt{2}},$$

and electric field intensities $$\left|(G-1)\frac{E_1^2 + E_2^2}{2\sqrt{2}}\right|^2 \text{ and } \left|G\frac{E_1^2 + E_2^2}{2\sqrt{2}} - \frac{E_1^3 + E_2^3}{2\sqrt{2}}\right|^2$$

correspond to the high logic value. Thus, the generated photonic output signal corresponds to the XOR logic function between the photonic input signals A and B.

Figure 3:
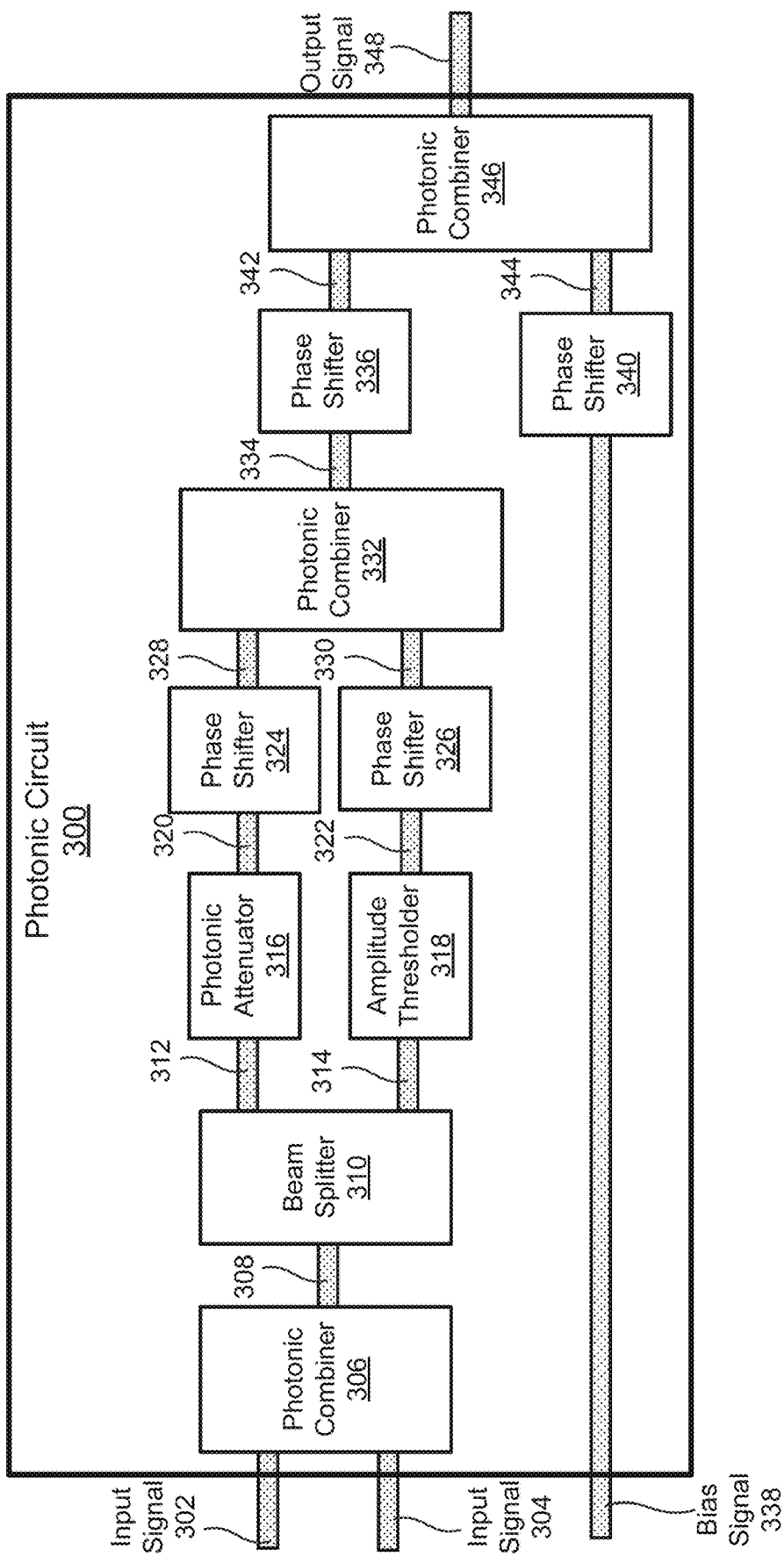
FIG. 3 illustrates an example cascadable photonic circuit that includes at least one nonlinear amplitude thresholder and at least one photonic attenuator, in accordance with some embodiments.

FIG. 3 illustrates an example cascadable photonic circuit 300 that includes at least one nonlinear amplitude thresholder and at least one photonic attenuator, in accordance with some embodiments. The photonic circuit 300 may utilize one or more cascadable reconfigurable photonic gates for performing different logic functions on photonic signals. Hence, the photonic circuit 300 can be also referred to as a "universal logic photonic circuit". The photonic circuit 300 may include a photonic combiner 306, a beam splitter 310 connected to an output port of the photonic combiner 306, a photonic attenuator 316 connected to a first output port of the beam splitter 310, an amplitude thresholder 318 connected to a second output port of the beam splitter 310, a phase shifter 324 connected to an output port of the photonic attenuator 316, a phase shifter 326 connected to an output port of the amplitude thresholder 318, a photonic combiner 332 connected to an output port of the phase shifter 324 and an output port of the phase shifter 326, a phase shifter 336 connected to an output port of the photonic combiner 332, a phase shifter 340, and a photonic combiner 346 connected to an output port of the phase shifter 336 and an output port of the phase shifter 340. The photonic circuit 300 may generate a photonic output signal 348 as a logical function of photonic input signals 302, 304 (and, optionally, one or more additional photonic input signals). The photonic circuit 300 may be configured to operate as a nonlinear XOR photonic gate, a nonlinear XNOR (exclusive 'NOR') photonic gate, a nonlinear OR photonic gate, a nonlinear NOR photonic gate, a nonlinear AND photonic gate, a nonlinear NAND gate, some other type of nonlinear photonic logic gate, or some combination thereof. The photonic circuit 300 may include fewer or additional components not shown in FIG. 3, such as, but not limited to, additional phase shifters for compensation of fabrication variations, linear photonic amplifiers, and/or photonic attenuators.

The photonic combiner 306 may receive a pair of photonic input signals 302, 304 and generate a photonic signal 308 that represents a logical combination of the photonic input signals 302 and 304. Thus, the photonic combiner 306 operates as a linear OR photonic logic gate. The photonic input signals 302, 304 may be light signals of corresponding input amplitudes (that each corresponds to logical "1" or logical "0"), corresponding input phases and/or corresponding input modes (i.e., input light spatial distribution and/or input wavelengths) injected into a set of input ports of the photonic combiner 306. The photonic input signals 302, 304 may be generated by an array of lasers (not shown in FIG. 3). The array of lasers may be instructed (i.e., triggered) by at least one processor (e.g., optical processor, electronic processor, electro-optical processor, etc.) coupled to the array of lasers to generate the photonic input signals 302, 304 (of specific amplitudes, phases and/or modes (or wavelengths). The set of input ports of the photonic combiner 306 may represent, e.g., a set of waveguides, a set of waveguide polarizations, a set of waveguide modes, a set of light wavelengths, etc. The photonic signal 308 may be a light signal of corresponding output amplitudes (that each corresponds to logical "1" or logical "0"), corresponding output phase and/or corresponding output mode (i.e., output light spatial distribution and/or output wavelength) detected at an output port of the photonic combiner 306. The output port of the photonic combiner 306 may represent, e.g., a waveguide, a waveguide polarization, a waveguide mode, a light wavelength, a signal radiated by the photonic combiner 306, etc. The photonic combiner 306 may pass the photonic signal 308 to the beam splitter 310.

The beam splitter 310 may receive the photonic signal 308 at its input port. The input port of the beam splitter 310 may represent, e.g., a waveguide, a waveguide polarization, a waveguide mode, a light wavelength, etc. The beam splitter 310 is a linear photonic component that splits the received photonic signal 308 into two photonic signals 312, 314. Each photonic signal 312, 314 may be output at a respective output port of the beam splitter 310. A set of output ports of the beam splitter 310 may represent, e.g., a set of waveguides, a set of waveguide polarizations, a set of waveguide modes, a set of light wavelengths, signals radiated by the beam splitter 310, etc. The photonic signals 312 and 314 produced by the beam splitter 210 may be passed to the photonic attenuator 316 and the amplitude thresholder 318, respectively.

The photonic attenuator 316 may receive the photonic signal 312 at its input port. The input port of the photonic attenuator 316 may represent, e.g., a waveguide, a waveguide polarization, a waveguide mode, a light wavelength, etc. The photonic attenuator 316 is a linear photonic component that generates a photonic signal 320 by attenuating amplitudes of the received photonic signal 312. The photonic attenuator 316 may operate as a reconfigurable photonic gate that can be configured to produce the photonic signal 320 of a specific amplitude level so that the photonic circuit 300 performs a particular logic function. The photonic signal 320 may be output at an output port of the photonic attenuator 316. The output port of the photonic attenuator 316 may represent, e.g., a waveguide, a waveguide polarization, a waveguide mode, a light wavelength, a signal radiated by the photonic attenuator 316, etc. The photonic attenuator 316 may pass the photonic signal 320 to the phase shifter 324.

The amplitude thresholder 318 may receive the photonic signal 314 at an input port of the amplitude thresholder 318. The input port of the amplitude thresholder 318 may represent, e.g., a waveguide, a waveguide polarization, a waveguide mode, a light wavelength, etc. The amplitude thresholder 318 may be a nonlinear photonic component that generates a photonic signal 322 by processing each amplitude of the received photonic signal 314 while operating in a first region of a transfer function of the amplitude thresholder 318 associated with a first operating regime (e.g., the region 255 or the region 285), in a second region of the transfer function associated with a second operating regime (e.g., the region 257 or the region 287), or in a third region of the transfer function associated with a third operating regime (e.g., the region 260 or the region 290). An operating regime of the amplitude thresholder 318 may depend on a level of each amplitude of the photonic signal 214 that is input to the amplitude thresholder 318. The amplitude thresholder 318 may be silicon-based, e.g., made of silicon or silicon nitride, or made of some other non-silicon material. The amplitude thresholder 318 may saturate an amplitude of the photonic signal 314 to a first amplitude level, when the amplitude thresholder 318 operates in the first region. The amplitude thresholder 318 may process an amplitude of the photonic signal 314 by applying a transfer gain of the second region to generate an amplitude of the photonic signal 322, when the amplitude thresholder 318 operates in the second region. And, the amplitude thresholder 318 may saturate an amplitude of the photonic signal 314 to a second amplitude level, when the amplitude thresholder 318 operates in the third region.

Alternatively, the amplitude thresholder 318 may be implemented as the nonlinear optical saturable absorber. The amplitude thresholder 318 implemented as the nonlinear optical saturable absorber may generate the photonic signal 322 by saturating (i.e., absorbing) an amplitude of the photonic signal 314 to a threshold amplitude level (e.g., approximately equal to zero) when operating in a first region of a transfer function of the amplitude thresholder 318 implemented as the nonlinear optical saturable absorber, which can be referred to as a first operating regime of the amplitude thresholder 318. Alternatively, the amplitude thresholder 318 implemented as the nonlinear optical saturable absorber may generate the photonic signal 322 by substantially propagating an amplitude of the photonic signal 314 when operating in a second region of the transfer function, which can be referred to as a second operating regime of the amplitude thresholder 318. An operating regime of the amplitude thresholder 318 implemented as the nonlinear optical saturable absorber may depend on the amplitude of the photonic signal 314.

Alternatively, the amplitude thresholder 318 may be implemented as a SOA-based amplitude thresholder. In such a case, the amplitude thresholder 318 may operate as a nonlinear active photonic amplifier that generates the photonic signal 322 by saturating an amplitude of the photonic signal 314 to a defined amplitude level (e.g., above zero amplitude level) while being configured to operate in a first region of a transfer function of the SOA-based amplitude thresholder. Or the amplitude thresholder 318 implemented as the SOA-based amplitude thresholder may operate in a second region of the transfer function and generate the photonic signal 322 by applying a gain of the second region to an amplitude of the photonic signal 314. The amplitude thresholder 318 implemented as the SOA-based amplitude thresholder may operate in the first region or in the second region depending on an amplitude level of the photonic signal 314. Alternatively, the amplitude thresholder 318 may be implemented as some other photonic thresholding device. Alternatively, the amplitude thresholder 318 may include a cascading connection of one or more saturable absorbers and one or more SOA-based amplitude thresholders (e.g., as shown in FIG. 5A). The photonic signal 322 generated by the amplitude thresholder 318 may be output at an output port of the amplitude thresholder 318. The output port of the amplitude thresholder 318 may represent, e.g., a waveguide, a waveguide polarization, a waveguide mode, a light wavelength, a signal radiated by the amplitude thresholder 318, etc. The amplitude thresholder 318 may pass the photonic signal 322 to the phase shifter 326.

The phase shifter 324 may receive the photonic signal 320 at its input port. The input port of the phase shifter 324 may represent, e.g., a waveguide, a waveguide polarization, a waveguide mode, a light wavelength, etc. The phase shifter 324 is a linear photonic component that generates a photonic signal 328 by shifting a phase of the received photonic signal 320. For example, the phase shifter 324 may apply a phase shift of $\pi$ radians to the photonic signal 320, i.e., the photonic signal 328 may represent an inverted version of the photonic signal 320. The photonic signal 328 may be output at an output port of the phase shifter 324. The output port of the phase shifter 324 may represent, e.g., a waveguide, a waveguide polarization, a waveguide mode, a light wavelength, a signal radiated by the phase shifter 324, etc. The photonic signal 328 generated by the phase shifter 324 may be passed to the photonic combiner 332.

The phase shifter 326 may receive the photonic signal 322 at its input port. The input port of the phase shifter 326 may represent, e.g., a waveguide, a waveguide polarization, a waveguide mode, a light wavelength, etc. The phase shifter 326 is a linear photonic component that generates a photonic signal 330 by shifting a phase of the received photonic signal 322. For example, the phase shifter 326 may apply a phase shift of $\pi$ radians to the photonic signal 322, i.e., the photonic signal 330 may represent an inverted version of the photonic signal 322. The photonic signal 330 may be output at an output port of the phase shifter 326. The output port of the phase shifter 326 may represent, e.g., a waveguide, a waveguide polarization, a waveguide mode, a light wavelength, a signal radiated by the phase shifter 326, etc. The photonic signal 330 generated by the phase shifter 326 may be passed to the photonic combiner 332.

The photonic combiner 332 may receive, at its first input port, the photonic signal 328 generated by the phase shifter 324. The photonic combiner 332 may further receive, at its second input port, the photonic signal 330 generated by the phase shifter 326. The set of input ports of the photonic combiner 332 may represent, e.g., a set of waveguides, a set of waveguide polarizations, a set of waveguide modes, a set of light wavelengths, etc. The photonic combiner 332 may generate a photonic signal 334 by combining the photonic signal 328 and the photonic signal 330. Thus, the photonic combiner 332 operates as a linear OR photonic logic gate. The photonic signal 334 may be output at an output port of the photonic combiner 332. The output port of the photonic combiner 332 may represent, e.g., a waveguide, a waveguide polarization, a waveguide mode, a light wavelength, a signal radiated by the photonic combiner 332, etc. The photonic combiner 332 may pass the photonic signal 334 to the phase shifter 336.

The phase shifter 336 may receive the photonic signal 334 at its input port. The input port of the phase shifter 336 may represent, e.g., a waveguide, a waveguide polarization, a waveguide mode, a light wavelength, etc. The phase shifter 336 is a linear photonic component that generates a photonic signal 342 by shifting a phase of the received photonic signal 334. For example, the phase shifter 336 may apply a phase shift of $\pi$ radians to the photonic signal 334, i.e., the photonic signal 342 may represent an inverted version of the photonic signal 334. The photonic signal 342 may be output at an output port of the phase shifter 336. The output port of the phase shifter 336 may represent, e.g., a waveguide, a waveguide polarization, a waveguide mode, a light wavelength, a signal radiated by the phase shifter 336, etc. The photonic signal 342 generated by the phase shifter 336 may be passed to the photonic combiner 346.

The phase shifter 340 may receive a bias signal 338 at an input port of the phase shifter 340. The input port of the phase shifter 340 may represent, e.g., a waveguide, a waveguide polarization, a waveguide mode, a light wavelength, etc. The bias signal 338 that is input to the phase shifter 340 is a light signal of a defined amplitude level that is constant over time. The bias signal 338 may be generated by, e.g., a photonic local oscillator coupled to the input port of the phase shifter 340 (not shown in FIG. 3). The phase shifter 340 is a linear photonic component that generates a photonic signal 344 by shifting a phase of the received bias signal 344. For example, the phase shifter 340 may apply a phase shift of π radians to the bias signal 338, i.e., the photonic signal 344 may represent an inverted version of the bias signal 338. The photonic signal 344 may be output at an output port of the phase shifter 340. The output port of the phase shifter 340 may represent, e.g., a waveguide, a waveguide polarization, a waveguide mode, a light wavelength, a signal radiated by the phase shifter 340, etc. The photonic signal 344 generated by the phase shifter 340 may be passed to the photonic combiner 346.

The photonic combiner 346 may receive, at its first input port, the photonic signal 342 generated by the phase shifter 336. The photonic combiner 346 may further receive, at its second input port, the photonic signal 344 generated by the phase shifter 340. The set of input ports of the photonic combiner 346 may represent, e.g., a set of waveguides, a set of waveguide polarizations, a set of waveguide modes, a set of light wavelengths, etc. The photonic combiner 346 may generate the photonic output signal 348 by combining the photonic signal 342 and the photonic signal 344. Thus, the photonic combiner 346 operates as a linear OR photonic logic gate. The photonic output signal 348 may be output at an output port of the photonic combiner 346. The output port of the photonic combiner 346 may represent, e.g., a waveguide, a waveguide polarization, a waveguide mode, a light wavelength, a signal radiated by the photonic combiner 346, etc. The output port of the photonic combiner 346 may also represent an output port of the photonic circuit 300.

In one or more embodiments, the photonic attenuator 316 is configured to generate the photonic signal 320 having amplitudes that correspond to the "low logic value", an amplitude of the bias signal 338 is set to the "low logic value", and the amplitude thresholder 318 is configured to operate in accordance with the thresholder model 250 in FIG. 2C or the thresholder model 280 in FIG. 2E. In such cases, the photonic output signal 348 represents a resulting light signal of the XOR logic operation of the photonic input signal 302 and the photonic input signal 304. Hence, in such cases, the photonic circuit 300 operates as a nonlinear XOR photonic logic gate. Since the photonic output signal 348 together with the photonic input signals 302 and 304 form an accurate truth table of an XOR photonic logic gate (i.e., no errors are propagated to the output port of the photonic circuit 300), the photonic circuit 300 operating as a nonlinear XOR photonic gate is cascadable, i.e., the photonic circuit 300 can be directly connected with other (same or different) photonic circuits within a photonic processor.

In one or more other embodiments, the photonic attenuator 316 is configured to generate the photonic signal 320 having amplitudes that correspond to the "low logic value", an amplitude of the bias signal 338 is set the "high logic value", and the amplitude thresholder 318 is configured to operate in accordance with the thresholder model 250 or the thresholder model 280. In such cases, the photonic output signal 348 represents a resulting light signal of the XNOR logic operation of the photonic input signal 302 and the photonic input signal 304. Hence, in such cases, the photonic circuit 300 operates as a nonlinear XNOR photonic logic gate. Since the photonic output signal 348 together with the photonic input signals 302 and 304 form an accurate truth table of an XNOR photonic logic gate (i.e., no errors are propagated to the output port of the photonic circuit 300), the photonic circuit 300 operating as a nonlinear XNOR photonic gate is cascadable, i.e., the photonic circuit 300 can be directly connected with other (same or different) photonic circuits within a photonic processor.

In one or more other embodiments, the photonic attenuator 316 is configured to generate the photonic signal 320 having amplitudes that correspond to the "high logic value", an amplitude of the bias signal 338 is set to the "low logic value", and the amplitude thresholder 318 is configured to operate in accordance with the thresholder model 280. In such cases, the photonic output signal 348 represents a resulting light signal of the OR logic operation of the photonic input signal 302 and the photonic input signal 304. Hence, in such cases, the photonic circuit 300 operates as a nonlinear OR photonic logic gate. Since the photonic output signal 348 together with the photonic input signals 302 and 304 form an accurate truth table of an OR photonic logic gate (i.e., no errors are propagated to the output port of the photonic circuit 300), the photonic circuit 300 operating as a nonlinear OR photonic gate is cascadable, i.e., the photonic circuit 300 can be directly connected with other (same or different) photonic circuits within a photonic processor.

In one or more other embodiments, the photonic attenuator 316 is configured to generate the photonic signal 320 having amplitudes that correspond to the "high logic value", an amplitude of the bias signal 338 is set to the "high logic value", and the amplitude thresholder 318 is configured to operate in accordance with the thresholder model 280. In such cases, the photonic output signal 348 represents a resulting light signal of the NOR logic operation of the photonic input signal 302 and the photonic input signal 304. Hence, in such cases, the photonic circuit 300 operates as a nonlinear NOR photonic logic gate. Since the photonic output signal 348 together with the photonic input signals 302 and 304 form an accurate truth table of an NOR photonic logic gate (i.e., no errors are propagated to the output port of the photonic circuit 300), the photonic circuit 300 operating as a nonlinear NOR photonic gate is cascadable, i.e., the photonic circuit 300 can be directly connected with other (same or different) photonic circuits within a photonic processor.

In one or more other embodiments, the photonic attenuator 316 is configured to generate the photonic signal 320 having amplitudes that correspond to the "high logic value", an amplitude of the bias signal 338 is set to the "low logic value", and the amplitude thresholder 318 is configured to operate in accordance with the thresholder model 250. In such cases, the photonic output signal 348 represents a resulting light signal of the AND logic operation of the photonic input signal 302 and the photonic input signal 304. Hence, in such cases, the photonic circuit 300 operates as a nonlinear AND photonic logic gate. Since the photonic output signal 348 together with the photonic input signals 302 and 304 form an accurate truth table of an AND photonic logic gate (i.e., no errors are propagated to the output port of the photonic circuit 300), the photonic circuit 300 operating as a nonlinear AND photonic gate is cascadable, i.e., the photonic circuit 300 can be directly connected with other (same or different) photonic circuits within a photonic processor.

In one or more other embodiments, the photonic attenuator 316 is configured to generate the photonic signal 320 having amplitudes that correspond to the "high logic value", an amplitude of the bias signal 338 is set to the "high logic value", and the amplitude thresholder 318 is configured to operate in accordance with the thresholder model 250. In such cases, the photonic output signal 348 represents a resulting light signal of the NAND logic operation of the photonic input signal 302 and the photonic input signal 304.

Hence, in such cases, the photonic circuit 300 operates as a nonlinear NAND photonic logic gate. Since the photonic output signal 348 together with the photonic input signals 302 and 304 form an accurate truth table of an NAND photonic logic gate (i.e., no errors are propagated to the output port of the photonic circuit 300), the photonic circuit 300 operating as a nonlinear NAND photonic gate is cascadable, i.e., the photonic circuit 300 can be directly connected with other (same or different) photonic circuits within a photonic processor.

In general, the photonic circuit 300 can be designed with more or less elements than shown in FIG. 3 depending on how the photonic circuit 300 is configured to operate. Generally, any photonic circuit that utilizes a sigmoid type of nonlinearity (such as the amplitude thresholder 318) can be described as the photonic circuit 300, or a variation of the photonic circuit 300 having more or less elements.

Nonlinear amplitude thresholders utilized in the photonic circuits 100, 200 and 300 (i.e., the amplitude thresholders 118, 120, 216, 318) may be all-optical thresholders implemented with a variety of approaches in integrated or free-space, and variants or combinations thereof, including but not limited to resonator-based devices or circuits, saturable absorbers including based on graphene, MoS2 or other 2D materials, carbon nanotubes, dyes, unpumped gain medium, saturable semiconductor cavity laser mirror (i.e., SESAMs), or a semiconductor absorber (e.g., quantum dots, SOA, ion-implanted, reverse-biased or unpumped semiconductors, etc.), or artificial saturable absorbers (e.g., Kerr lensing, nonlinear polarization rotation, fiber loop mirror, etc.). The nonlinear amplitude thresholders of the photonic circuits 100 and 200 may block light signals having intensity levels below a threshold value and propagate light signals having intensity levels above the threshold value. More details about transfer functions and different configurations of nonlinear amplitude thresholders are described in relation to FIGS. 4A-4B, FIGS. 5A-5B. Details about implementation of resonator-based nonlinear amplitude thresholders are described in relation to FIGS. 6A-6B.

Figure 4A:
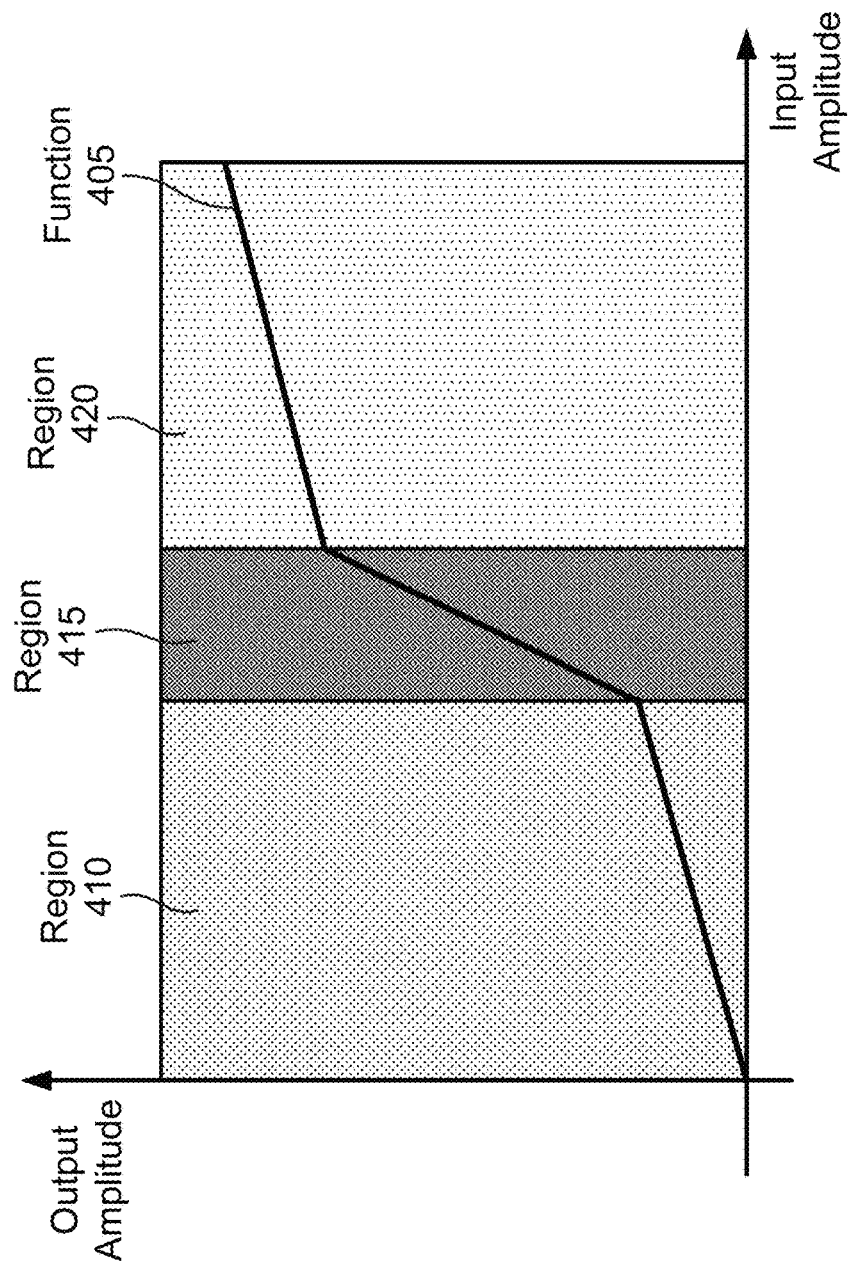
FIG. 4A illustrates an example generalized graph of a transfer function of a nonlinear amplitude thresholder represented as a piece-wise function, in accordance with some embodiments.

Piece-Wise Transfer Functions and Different Configurations for Nonlinear Amplitude Thresholders FIG. 4A illustrates an example generalized graph 400 of a transfer function of a nonlinear amplitude thresholder represented as a piece-wise function 405, in accordance with some embodiments. The piece-wise function 405 can be also referred to as a "piece-wise sigmoid function". The nonlinear amplitude thresholder featuring the piece-wise transfer function 405 may be implemented as a photonic resonator-based amplitude thresholder, SOA-based amplitude thresholder, saturable absorber-based amplitude thresholder, some other type of nonlinear amplitude thresholder, or some combination thereof. The piece-wise function 405 may represent a nonlinear transfer function of the amplitude thresholder 118, the amplitude thresholder 120, the amplitude thresholder 216, and/or the amplitude thresholder 318. And, each of the transfer functions 162, 252, 282 may represent an approximation of the piece-wise function 405.

The nonlinear amplitude thresholder having the transfer function represented by the piece-wise function 405 may operate in a region 410 associated with a first operating regime, in a region 415 associated with a second operating regime, or in a region 420 associated with a third operating regime, which depends on an amplitude level of a photonic signal that is input into the amplitude thresholder (i.e., on a level of the "input amplitude"). In some embodiments, the regions 410 and 420 are approximately nonlinear regions of the piece-wise function 405, and the region 415 is approximately linear region of the piece-wise function 405. When the nonlinear amplitude thresholder operates in the region 410, an amplitude of a photonic signal output by the amplitude thresholder (i.e., "output amplitude") may be saturated to a first saturation level. When the nonlinear amplitude thresholder operates in the region 420, the output amplitude may be saturated to a second saturation level that is higher than the first saturation level. When the nonlinear amplitude thresholder operates in the region 415, the output amplitude may not be saturated. Instead, the output amplitude may be determined based on a gain (i.e., slope) of the piece-wise function 405 in the region 415.

Figure 4B:
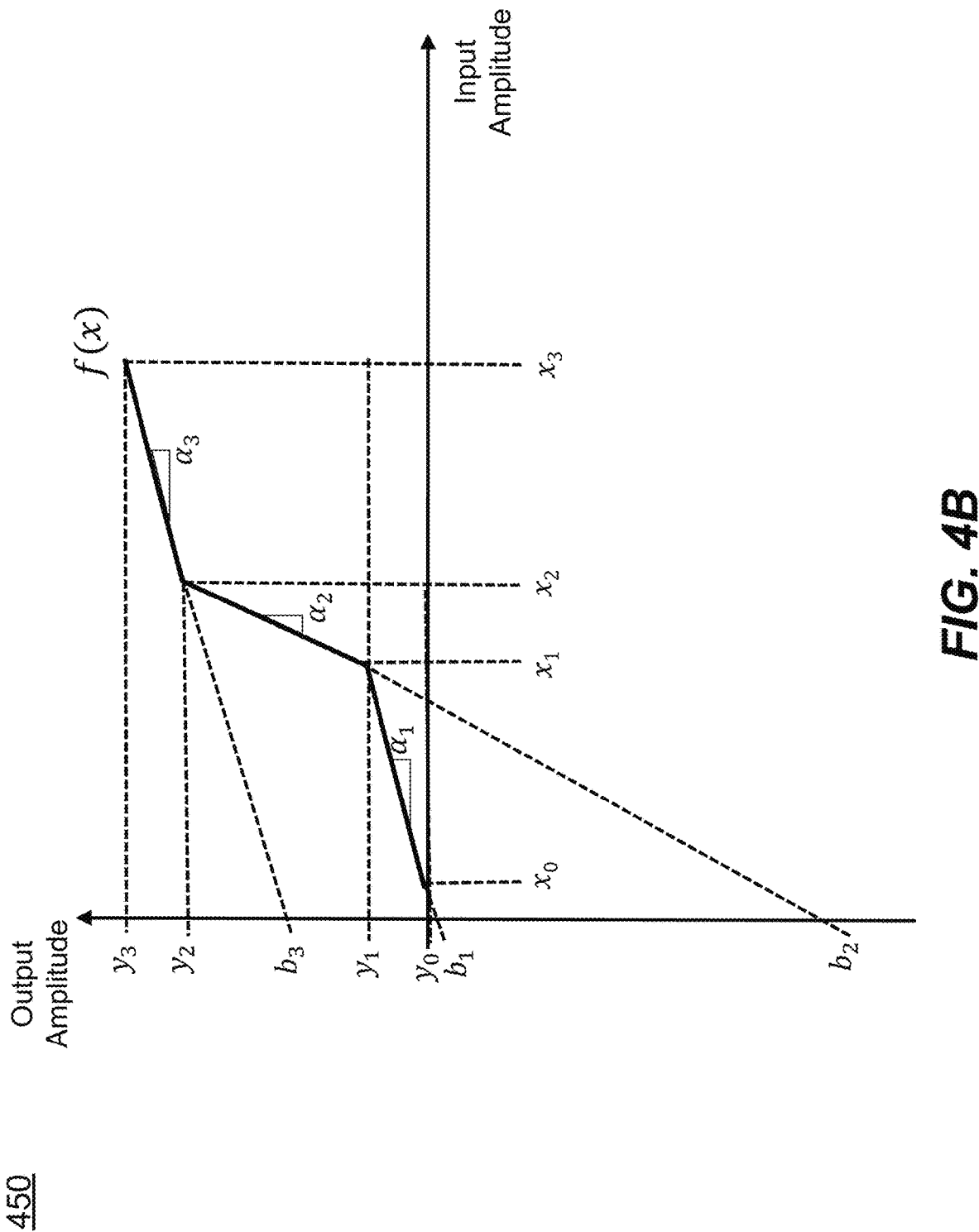
FIG. 4B illustrates another example generalized graph of a transfer function of a nonlinear amplitude thresholder represented as a piece-wise function, in accordance with some embodiments.

FIG. 4B illustrates an example generalized graph 450 of a transfer function of a nonlinear amplitude thresholder represented as a piece-wise function $f(x)$, in accordance with some embodiments. The piece-wise function $f(x)$ can be also referred to as a "piece-wise sigmoid function". The transfer function of the nonlinear amplitude thresholder may also be represented as a smooth continuous function or a combination of the piece-wise function and the smooth continuous function. The nonlinear amplitude thresholder featuring the piece-wise transfer function $f(x)$ may be implemented as a photonic resonator-based amplitude thresholder, SOA-based amplitude thresholder, saturable absorber-based amplitude thresholder, some other type of nonlinear amplitude thresholder, or some combination thereof. The piece-wise function $f(x)$ may represent a transfer function of the amplitude thresholder 118, the amplitude thresholder 120, the amplitude thresholder 216, and/or the amplitude thresholder 318. And, each of the transfer functions 162, 252, 282 may represent an approximation of the piece-wise function $f(x)$.

The general nonlinearity of the non-linear amplitude thresholder may be represented by the piece-wise function $f(x)$ that has three slopes, i.e., the first slope $\alpha_1=(y_1-y_0)/(x_1-x_0)$ on a first interval of input amplitudes $x \in [x_0, x_1]$, the second slope $\alpha_2=(y_2-y_1)/(x_2-x_1)$ on a second interval of input amplitudes $x \in (x_1, x_2]$, and the third slope $\alpha_3=(y_3-y_2)/(x_3-x_2)$ on a third interval of input amplitudes $x \in (x_2, x_3]$. Thus, the piece-wise transfer function $f(x)$ can be defined as:

$$f(x) = \begin{cases} \alpha_1 x + b_1, & \text{if } x \in [x_0, x_1] \\ \alpha_2 x + b_2, & \text{if } x \in (x_1, x_2], \\ \alpha_3 x + b_3, & \text{if } x \in (x_2, x_3] \end{cases} \quad (1)$$

where the values of parameters $b_1$, $b_2$ and $b_3$ are defined as in FIG. 4B. The first interval of input amplitudes $x \in [x_0, x_1]$ may define operation of the nonlinear amplitude thresholder in a first region associated with a first operating regime (e.g., the region 410), the second interval of input amplitudes $x \in (x_1, x_2]$ may define operation of the nonlinear amplitude thresholder in a second region associated with a second operating regime (e.g., the region 415); and the third interval of input amplitudes $x \in (x_2, x_3]$ may define operation of the nonlinear amplitude thresholder in a third region associated with a third operating regime (e.g., the region 420).

Note that, in ideal case, it would hold that $\alpha_1 \to 0$, $\alpha_2 \to 1$, $\alpha_3 \to 0$; however, in general, $\alpha_2 >> \alpha_1$, $\alpha_2 >> \alpha_3$, $\alpha_3 \approx \alpha_1$. Thus, in general, it holds that $y_1 \approx y_0$, and the output amplitude value of $y_1$ (or $y_0$) may represent a first saturation level when the nonlinear amplitude thresholder operates in the first region. The input amplitude value x greater than or equal to $x_0$ and lower than or equal to $x_1$ may represent an input threshold level for operating the nonlinear amplitude thresholder in the second region. Furthermore, in general, it holds that $y_3 \approx y_2$, and the output amplitude value of $y_3$ (or $y_2$) may represent a second saturation level higher than the first saturation level when the nonlinear amplitude thresholder operates in the third region. The input amplitude value of $x_2$ may represent an input threshold level for operating the nonlinear amplitude thresholder in the third region. The nonlinear amplitude thresholder may operate in the third region defined when the input amplitude is greater than the threshold level of $x_2$ and less than or equal to $x_3$, where the input amplitude value of $x_3$ may represent a largest input amplitude value for which the nonlinear amplitude thresholder is configured.

Figure 5B:
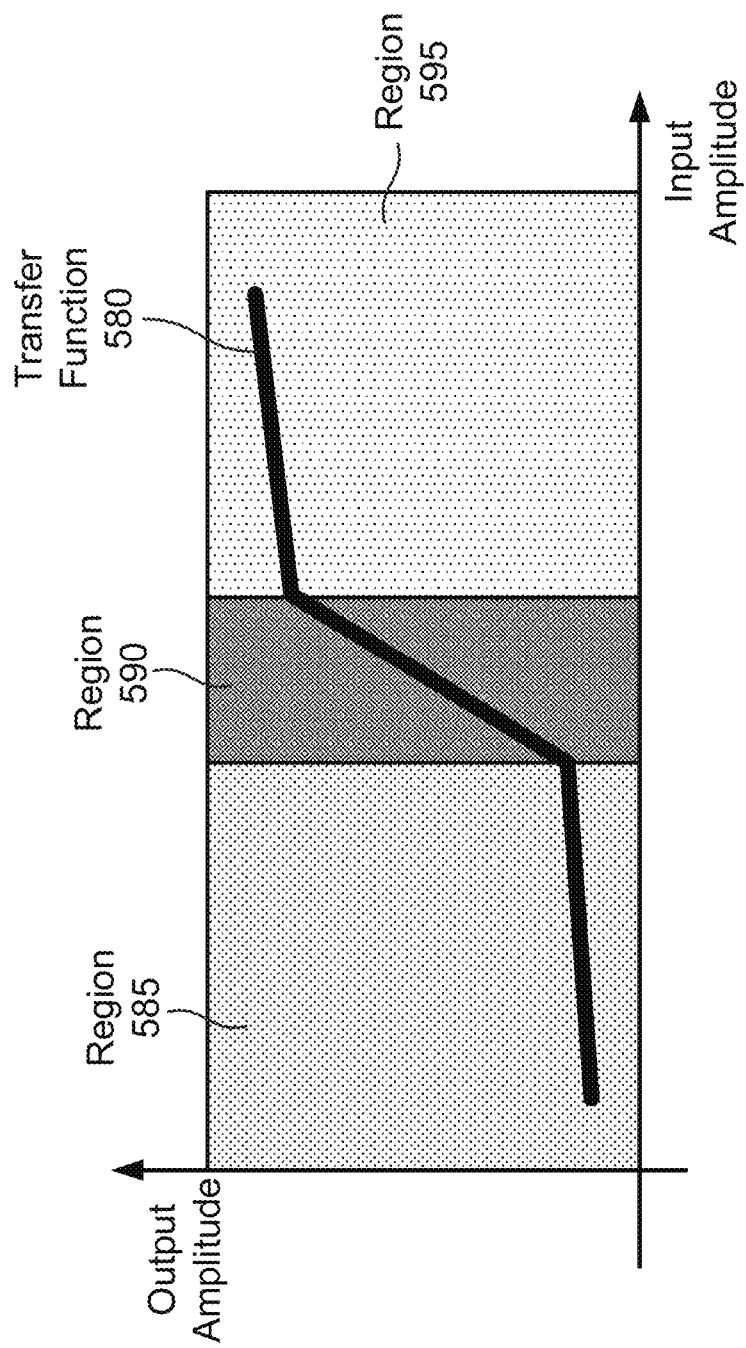
FIG. 5B illustrates an example graph of a transfer function of a configuration of the nonlinear amplitude thresholder in FIG. 5A, in accordance with some embodiments.

FIG. 5A illustrates examples of different configurations of a nonlinear amplitude thresholder, in accordance with some embodiments. Each configuration of a nonlinear amplitude thresholder in FIG. 5A may feature a corresponding nonlinear transfer function having a same general piece-wise (e.g., sigmoid function) representation (e.g., as shown in FIG. 5B). Although FIG. 5A shows various different configurations of a nonlinear amplitude thresholder, it should be understood that some other configurations of a nonlinear amplitude thresholder that are not shown in FIG. 5A are possible.

A nonlinear amplitude thresholder 500 in FIG. 5A may include a single saturable absorber 505. Alternatively, instead of the single saturable absorber 505, the nonlinear amplitude thresholder 500 may include a single SOA-based amplitude thresholder (referred to as "SOA" in FIG. 5A). The nonlinear amplitude thresholder 500 may be an embodiment of the amplitude thresholder 118, the amplitude thresholder 120, the amplitude thresholder 216, and/or the amplitude thresholder 318. A nonlinear amplitude thresholder 510 in FIG. 5A may include a SOA 515 and a saturable absorber 520, where an input port of the saturable absorber 520 is coupled to an output port of the SOA 515. The nonlinear amplitude thresholder 510 may be an embodiment of the amplitude thresholder 118, the amplitude thresholder 120, the amplitude thresholder 216, and/or the amplitude thresholder 318. A nonlinear amplitude thresholder 525 in FIG. 5A may include a pair of concatenated saturable absorbers 530 and 535, where an input port of the saturable absorber 535 is coupled to an output port of the saturable absorber 530. The nonlinear amplitude thresholder 525 may be an embodiment of the amplitude thresholder 118, the amplitude thresholder 120, the amplitude thresholder 216, and/or the amplitude thresholder 318.

A nonlinear amplitude thresholder 540 in FIG. 5A may include a saturable absorber 545 and a SOA 550, where an input port of the SOA 550 is coupled to an output port of the saturable absorber 545. The nonlinear amplitude thresholder 540 may be an embodiment of the amplitude thresholder 118, the amplitude thresholder 120, the amplitude thresholder 216, and/or the amplitude thresholder 318. A nonlinear amplitude thresholder 555 in FIG. 5A may include a SOA 560, a saturable absorber 565 and a SOA 570, where an input port of the saturable absorber 565 is coupled to an output port of the SOA 560 and an input port of the SOA 570 is coupled to an output port of the saturable absorber 565. The nonlinear amplitude thresholder 555 may be an embodiment of the amplitude thresholder 118, the amplitude thresholder 120, the amplitude thresholder 216, and/or the amplitude thresholder 318.

FIG. 5B illustrates an example graph 575 of a piece-wise transfer function 580 of a configuration of the nonlinear amplitude thresholder in FIG. 5A, in accordance with some embodiments. The configuration of the nonlinear amplitude thresholder having the transfer function represented by the piece-wise transfer function 580 may operate in a region 585 associated with a first operating regime, in a region 590 associated with a second operating regime, or in a region 590 associated with a third operating regime, which depends on an amplitude level of a photonic signal that is input into the corresponding configuration of the amplitude thresholder in FIG. 5A (i.e., on a level of the "input amplitude"). In some embodiments, the regions 585 and 595 are approximately nonlinear regions of the piece-wise transfer function 580, and the region 590 is approximately linear region of the piece-wise transfer function 580. When the nonlinear amplitude thresholder operates in the region 585, an amplitude of a photonic signal output by the amplitude thresholder (i.e., "output amplitude") may be saturated to a first saturation level. When the nonlinear amplitude thresholder operates in the region 590, the output amplitude may be saturated to a second saturation level that is higher than the first saturation level. When the nonlinear amplitude thresholder operates in the region 595, the output amplitude may not be saturated but instead determined based on a gain (i.e., slope) of the piece-wise transfer function 580 in the region 595. The piece-wise transfer function 580 may represent a transfer function of the amplitude thresholder 118, the amplitude thresholder 120, the amplitude thresholder 216, and/or the amplitude thresholder 318. And, each of the transfer functions 162, 252, 282 may represent an approximation of the piece-wise transfer function 580.

Each configuration of the nonlinear amplitude thresholder in FIG. 5A (i.e., each of the nonlinear amplitude thresholders 500, 510, 525, 540, 555) may feature a different piece-wise transfer function 580. Each of the nonlinear amplitude thresholders 500, 510, 525, 540, 555 may feature a piece-wise transfer function 580 with a unique set of slopes. Additionally or alternatively, each of the nonlinear amplitude thresholders 500, 510, 525, 540, 555 may feature a different region 585, a different region 590 and/or a different region 595. This is because each of the nonlinear amplitude thresholders 500, 510, 525, 540, 555 may require a different range of input amplitudes to operate in a corresponding region 585, 590, 595. Additionally or alternatively, each of the nonlinear amplitude thresholders 500, 510, 525, 540, 555 may feature different saturation levels when operating in the region 585 and/or the region 595. In one or more embodiments, the piece-wise transfer function 580 includes a gain (i.e., increase) in an output amplitude for all input amplitudes or individual input amplitudes. In one or more other embodiments, the piece-wise transfer function 580 does not provide any gain (i.e., increase) when generating an output amplitude.

Resonator-Based Nonlinear Amplitude Thresholders

A transmittance and reflectance spectrum of a nonlinear amplitude thresholder that is implemented as a photonic resonator can be characterized by a sharp spectral feature near a resonance frequency. Thus, light having the resonance frequency may be absorbed or blocked by the nonlinear amplitude thresholder and thus not transmitted—i.e., the nonlinear amplitude thresholder featuring a low transmittance; and light with frequency off-resonance may be almost fully transmitted—i.e., the nonlinear amplitude thresholder featuring a high transmittance. Because of how sharp a resonance spectrum is, a small change in a refractive index ($\Delta n$) of the photonic resonator (i.e., the nonlinear amplitude thresholder) may substantially change the transmission and/or reflection properties of light propagated through and/or reflected from the photonic resonator. By changing the refractive index of the nonlinear amplitude thresholder, one can directly change how much light propagates through and around the nonlinear amplitude thresholder.

For all-optical thresholders presented herein, the change in refractive index, $\Delta n$, may be the result of one or more nonlinear optical effects. When high-intensity light is incident on optical materials, the refractive index becomes dependent on the intensity of the light, i.e., $n=n_0+n_2I$, where no is the low-intensity (linear) refractive index of the medium, $n_2$ is the nonlinear refractive index coefficient, and/is the intensity of light. This is known as the Kerr effect, and its response time is instantaneous-making it the preferred nonlinearity for controlling ultrafast optics. In semiconductors like Silicon, a secondary effect occurs on longer timescales, named free carrier dispersion (FCD). The FCD represents another change in the refractive index $\Delta n$ due to the excitation of free electrons and holes in a conduction band. This effect occurs on, e.g., longer timescales. The aforementioned examples are by no means complete and other forms of optical nonlinearities may be applied.

Since the intensity of light in the photonic resonator affects the refractive index, and thus the resonance frequency, the photonic resonator (i.e., nonlinear amplitude thresholder) may be tuned to an optimized frequency of light. Low-intensity light may experience a low transmittance (due to absorption or extinction), and high-intensity light will result in a change in refractive index, $\Delta n$, and thus in a non-zero transmittance, or vice-versa. This can be utilized as the basis for designing the nonlinear amplitude thresholders utilized in the photonic circuits 100, 200 and 300. As the Kerr effect is relatively weak, the resulting spectral shift would be small. Thus, a geometry of the nonlinear amplitude thresholder may be designed to optimize further the transmittance spectrum (e.g., to make the transmittance spectrum have a sharper spectral feature which means a larger transmittance difference between low-intensity light and high-intensity light). The all-optical embodiment of the nonlinear amplitude thresholder utilized in the photonic circuits 100, 200 and 300 may have one of the two possible geometries shown in FIG. 6A and FIG. 6B. A person of ordinary skill in the art may also conceive of alternative implementations of a resonator-based all-optical thresholder including but not limited to photonic crystal resonators, nanobeam resonators, and Fabry-Perot resonators.

Figure 6A:
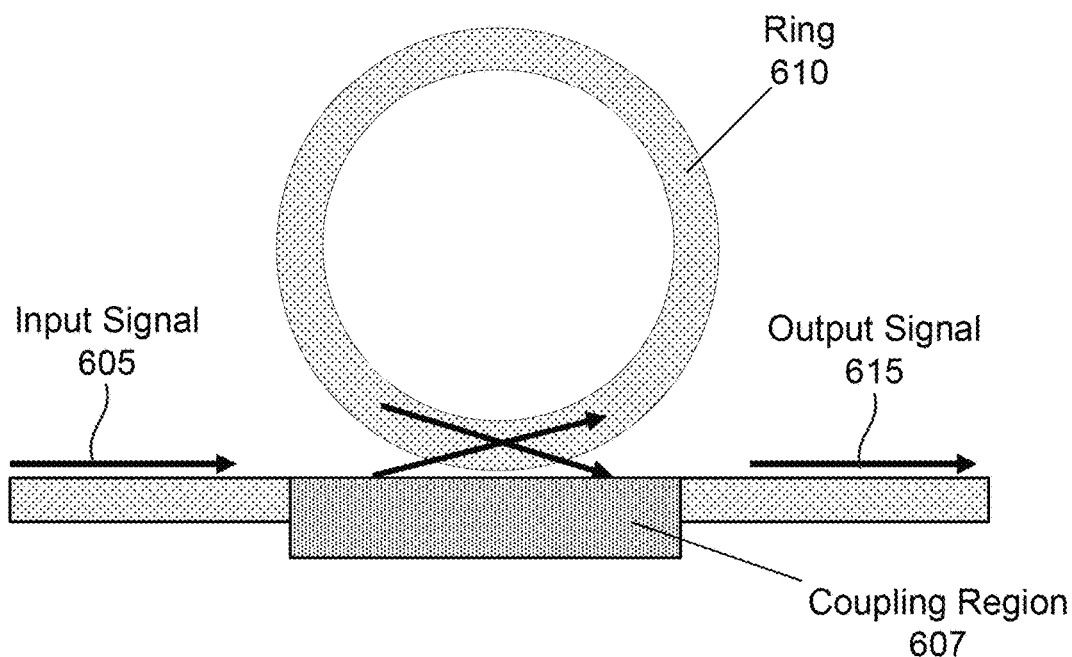
FIG. 6A illustrates an example nonlinear amplitude thresholder that uses a ring resonator, in accordance with some embodiments.

FIG. 6A illustrates an example optical thresholder 600 that uses a ring resonator (or race-track resonator), in accordance with some embodiments. The optical thresholder 600 may be an embodiment of the nonlinear amplitude thresholders 118, 120, 216, 318. A photonic input signal 605 (i.e., input light signal) may be incident to a coupling region 607 and may further propagate through a ring 610 before being in-coupled at the coupling region 607 to generate a photonic output signal 615 (i.e., output light signal). The coupling region 607 may be designed such that the optical thresholder 600 creates an interference between a resonance and the coupling region 607, which results in a Fano resonance that can be sharper than the pure resonance.

Figure 6B:
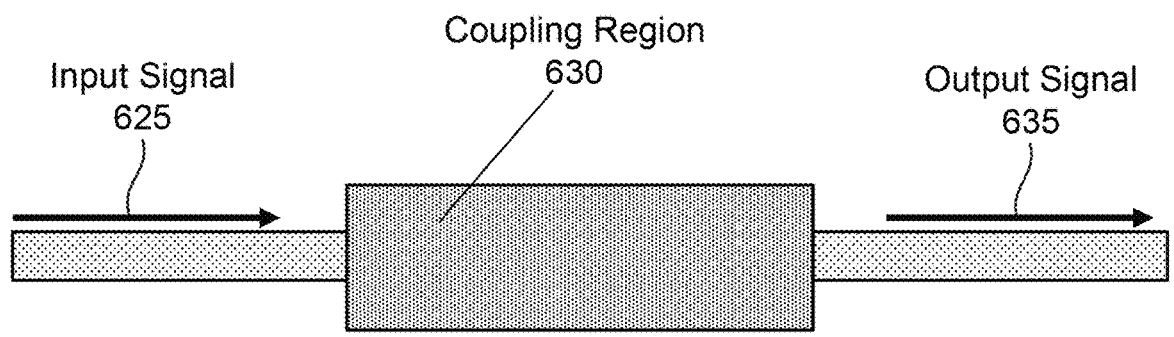
FIG. 6B illustrates an example nonlinear amplitude thresholder that uses a fully inverse-designed resonator, in accordance with some embodiments.

FIG. 6B illustrates an example optical thresholder 620 that uses a fully inverse-designed resonator, in accordance with some embodiments. The optical thresholder 620 may be an embodiment of the nonlinear amplitude thresholders 118, 120, 216, 318. A photonic input signal 625 (i.e., input light signal) may be incident to a coupling region 630 that generates a photonic output signal 635 (i.e., output light signal). The coupling region 630 may be inverse-designed such that the photonic output signal 635 has desired spectral features.

Designing the optical thresholders 600, 620 may involve optimizing an objective function using repeated electromagnetic simulations, where the objective function represents one or more properties of the photonic resonator (i.e., nonlinear amplitude thresholder). This may be achieved directly using nonlinear photonic inverse design, by simulating the optical thresholders 600 and 620 with two slightly different refractive indices, by designing the transmittance or reflectance spectra, or using some other objective that results in improved amplitude thresholding. Evaluating the nonlinear performance of the optical thresholders 600 and 620 prior to experiment may be accomplished using numerical and semi-analytical methods, including but not limited to, finite-difference time domain (FDTD) simulations, finite-difference frequency domain (FDFD) simulations, and nonlinear coupled mode theory calculations.

Example Process Flow

Figure 7:
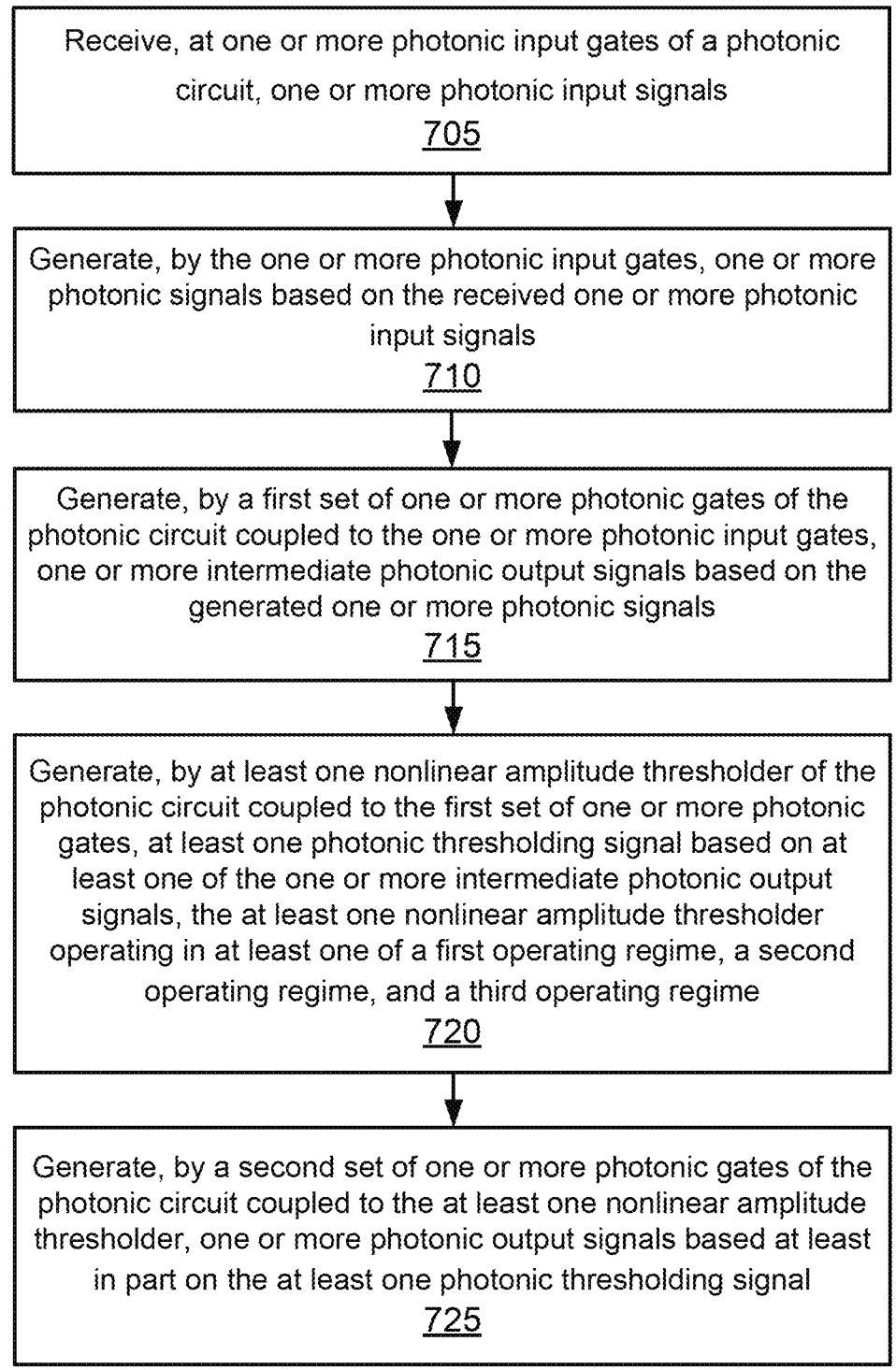
FIG. 7 is a flowchart illustrating an example method for operating a photonic circuit with at least one nonlinear amplitude thresholder, in accordance with some embodiments.

FIG. 7 is a flowchart illustrating an example method 700 for operating a photonic circuit with at least one nonlinear amplitude thresholder for correction of amplitude and phase errors, in accordance with some embodiments. The operations of method 700 may be performed at, e.g., the photonic circuit 100, the photonic circuit 200, or the photonic circuit 300. The photonic circuit may be part of a photonic processor that includes a cascaded connection of the photonic circuit and at least one other photonic component that includes the photonic circuit (e.g., cascaded connection of at least two photonic circuits). The photonic circuit may be deployed in a computing system (e.g., a photonic processor) that can further include a non-transitory computer-readable storage medium (e.g., optical, electrical, or electro-optical memory) for storing computer-executable instructions and data. The computing system may be an optical computing system (i.e., silicon photonics platform), an electronic computing system, some other type of computing system, or some combination thereof.

The photonic circuit receives 705, at one or more photonic input gates (e.g., the linear XOR logic gate 106, the photonic combiner 206, or the photonic combiner 306), one or more photonic input signals (e.g., two photonic input signals). The photonic circuit generates 710, by the one or more photonic input gates, one or more photonic signals based on the one or more photonic input signals. The one or more photonic input gates may comprise a linear XOR logic gate (e.g., the XOR logic gate 106) configured to generate the one or more photonic signals as an XOR logical function of a plurality of the one or more photonic input signals. Alternatively, the one or more photonic input gates may comprise a photonic combiner (e.g., photonic combiner 206 or the photonic combiner 306) configured to generate the one or more photonic signals by combining a plurality of the one or more photonic input signals.

The photonic circuit generates 715, by a first set of one or more photonic gates coupled to the one or more photonic input gates (e.g., the phase demultiplexer 112, the beam splitter 210, or the beam splitter 310), one or more intermediate photonic output signals based on the generated one or more photonic signals. The first set of one or more photonic gates may comprise a phase demultiplexer (e.g., the phase demultiplexer 112) configured to demultiplex the one or more photonic signals into a first of the one or more intermediate photonic output signals and a second of the one or more intermediate photonic output signals, based at least in part on a phase of the one or more photonic signals relative to a phase of a bias signal (e.g., the bias signal 110) input into the phase demultiplexer. The bias signal that is input to the phase demultiplexer may have a defined amplitude value that is constant over time. Alternatively, the first set of one or more photonic gates may comprise a beam splitter (e.g., the beam splitter 210 or the beam splitter 310) configured to split the one or more photonic signals into a first of the one or more intermediate photonic output signals and a second of the one or more intermediate photonic output signals. The first set of one or more photonic gates may further comprise a photonic attenuator (e.g., the photonic attenuator 316) having one or more inputs to receive the one or more intermediate photonic output signals from the beam splitter and configured to attenuate amplitudes of the received one or more intermediate photonic output signals to one or more configurable amplitude levels. Each configurable amplitude level produced by the photonic attenuator may be associated with a corresponding logic function of the photonic circuit.

The photonic circuit generates 720, by at least one nonlinear amplitude thresholder coupled to the first set of one or more photonic gates (e.g., the amplitude thresholders 118, 120, the amplitude thresholder 216, or the amplitude thresholder 318), at least one photonic thresholding signal based on at least one of the one or more intermediate photonic output signals, the at least one nonlinear amplitude thresholder operating in at least one of a first operating regime, a second operating regime, and a third operating regime. The at least one nonlinear amplitude thresholder may be configured to operate in the first operating regime, the second operating regime, or the third operating regime based on an amplitude of the at least one of the one or more intermediate photonic output signals. The at least one nonlinear amplitude thresholder may be a resonator-based nonlinear optical device. Alternatively, the at least one nonlinear amplitude thresholder may comprise a cascading connection of one or more saturable absorbers and one or more SOA-based amplitude thresholders.

The at least one nonlinear amplitude thresholder may comprise a first nonlinear amplitude thresholder (e.g., the amplitude thresholder 118) configured to generate a first photonic thresholding signal of the at least one photonic thresholding signal by saturating an amplitude of the first intermediate photonic output signal to a first amplitude level when the first nonlinear amplitude thresholder operates in the first operating regime, applying a transfer gain of to the amplitude of the first intermediate photonic output signal when the first nonlinear amplitude thresholder operates in the second operating regime, or saturating the amplitude of the first intermediate photonic output signal to a second amplitude level when the first nonlinear amplitude thresholder operates in the third operating regime. The at least one nonlinear amplitude thresholder may further comprise a second nonlinear amplitude thresholder (e.g., the amplitude thresholder 120) configured to generate a second photonic thresholding signal of the at least one photonic thresholding signal by saturating an amplitude of the second intermediate photonic output signal to the first amplitude level when the second nonlinear amplitude thresholder operates in the first operating regime, applying a transfer gain to the amplitude of the second intermediate photonic output signal when the second nonlinear amplitude thresholder operates in the second operating regime, or saturating the amplitude of the second intermediate photonic output signal to the second amplitude level when the second nonlinear amplitude thresholder operates in the third operating regime.

Alternatively, the at least one nonlinear amplitude thresholder (e.g., the amplitude thresholder 216 or the amplitude thresholder 318) may be configured to generate the at least one photonic thresholding signal by saturating an amplitude of the second intermediate photonic output signal to a first amplitude level when the at least one nonlinear amplitude thresholder operates in the first operating regime, applying a transfer gain to the amplitude of the second intermediate photonic output signal when the at least one nonlinear amplitude thresholder operates in the second operating regime, or saturating the amplitude of the second intermediate photonic output signal to a second amplitude level when the at least one nonlinear amplitude thresholder operates in the third operating regime. A phase shifter (e.g., the phase shifter 220 or the phase shifter 326) may be coupled to the at least one nonlinear amplitude thresholder, and the phase shifter may be configured to shift a phase of the at least one photonic thresholding signal to generate a phase-shifted photonic signal.

The photonic circuit generates 725, by a second set of one or more photonic gates coupled to the at least one nonlinear amplitude thresholder (e.g., the photonic combiner 126, the photonic combiner 224, or the photonic combiners 332 and 346 coupled to the phase shifters 336 and 340), one or more photonic outputs signal based at least in part on the at least one photonic thresholding signal. The second set of one or more photonic gates may comprise a photonic combiner (e.g., the photonic combiner 126) configured to generate the one or more photonic output signals by combining the first photonic thresholding signal and the second photonic thresholding signal. Alternatively, the second set of one or more photonic gates may comprise one or more photonic combiners (e.g., the photonic combiner 224, or the photonic combiners 332 and 346) configured to generate the one or more photonic output signals by combining at least the first intermediate photonic output signal and the phase-shifted photonic signal.

This disclosure presents a cascadable photonic circuit that utilizes one or more nonlinear photonic components (e.g., one or more nonlinear amplitude thresholders) for correction of errors (e.g., amplitude errors and/or phase errors) produced by linear photonic logic within the photonic circuit. The photonic circuit presented herein produces correct output results and can be directly cascaded with other photonic circuits within a photonic processor.

ADDITIONAL CONSIDERATIONS

The disclosed configurations beneficially provide for efficient design of photonic logic gates while substantially reducing a number of required numerical design simulations.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to effectively convey the substance of their work to others skilled in the art. While described functionally, computationally, or logically, these operations are understood to be implemented by computer programs or equivalent electrical circuits, microcode, or the like. Furthermore, at times, it has also proven convenient to refer to these arrangements of operations as modules without loss of generality. The described operations and associated modules can be embodied in software, firmware, hardware, or some combination thereof.

Any steps, operations, or processes described herein can be performed or implemented with one or more hardware or software modules, alone or in combination with other devices. In one embodiment, a software module is implemented with a computer program product comprising a computer-readable medium containing computer program code, which a computer processor can execute for performing any or all of the steps, operations, or processes described herein.

Embodiments of the disclosure can also relate to an apparatus for performing the operations herein. This apparatus can be specially constructed for the required purposes, and/or it can comprise a general-purpose computing device selectively activated or reconfigured by a computer program stored in the computer. Such a computer program can be stored in a non-transitory, tangible computer-readable storage medium or any media suitable for storing electrical instructions coupled to a computer system bus. Furthermore, any computing systems referred to in the specification can include a single processor or architectures employing multiple processor designs for increased computing capability.

Some embodiments of the present disclosure can further relate to a system comprising a processor, at least one computer processor, and a non-transitory computer-readable storage medium. The storage medium can store computer-executable instructions, which, when executed by the compiler operating on at least one computer processor, cause at least one computer processor to be operable for performing the operations and techniques described herein.

Finally, the language used in the specification has been principally selected for readability and instructional purposes, and it has not been selected to delineate or circumscribe the inventive subject matter. It is therefore intended that the scope of the disclosure be limited not by this detailed description but rather by any claims that issue on an application based hereon. Accordingly, the disclosure of the embodiments is intended to be illustrative, but not to limit the scope of the disclosure, which is set forth in the following claims.

What is claimed is:

1. A photonic circuit, comprising:
   one or more photonic input gates having one or more inputs to receive one or more photonic input signals, the one or more photonic input gates configured to generate one or more photonic signals based on the one or more photonic input signals;
   a first set of one or more photonic gates coupled to one or more outputs of the one or more photonic input gates, the first set of one or more photonic gates configured to generate one or more intermediate photonic output signals based on the generated one or more photonic signals;
   at least one nonlinear amplitude thresholder coupled to at least one output of the first set of one or more photonic gates, the at least one nonlinear amplitude thresholder configured to generate at least one photonic thresholding signal based on at least one of the one or more intermediate photonic output signals, the at least one nonlinear amplitude thresholder operating in at least one of a first operating regime, a second operating regime and a third operating regime; and
   a second set of one or more photonic gates coupled to at least one output of the at least one nonlinear amplitude thresholder, the second set of one or more photonic gates configured to generate one or more photonic output signals based at least in part on the at least one photonic thresholding signal.

2. The photonic circuit of claim 1, wherein the at least one nonlinear amplitude thresholder is configured to operate in the first operating regime, the second operating regime, or the third operating regime based on an amplitude of the at least one of the one or more intermediate photonic output signals.

3. The photonic circuit of claim 1, wherein the one or more photonic input gates comprise a linear XOR logic gate having at least a first input and a second input of the one or more inputs to receive a plurality of the one or more photonic input signals, the linear XOR logic gate configured to generate the one or more photonic signals as an XOR logical function of the received plurality of photonic input signals.

4. The photonic circuit of claim 1, wherein the one or more photonic input gates comprise a photonic combiner having at least a first input and a second input of the one or more inputs to receive a plurality of the one or more photonic input signals, the photonic combiner configured to generate the one or more photonic signals by combining the received plurality of photonic input signals.

5. The photonic circuit of claim 1, further comprising a bias signal that is input to the first set of one or more photonic gates, the bias signal having a defined amplitude value that is constant over time.

6. The photonic circuit of claim 1, wherein the first set of one or more photonic gates comprises a phase demultiplexer having at least one input to receive the one or more photonic signals, the phase demultiplexer configured to demultiplex the received one or more photonic signals into a first of the one or more intermediate photonic output signals and a second of the one or more intermediate photonic output signals, based at least in part on a phase of the one or more photonic signals relative to a phase of a bias signal input into the phase demultiplexer.

7. The photonic circuit of claim 6, wherein the at least one nonlinear amplitude thresholder comprises:
   a first nonlinear amplitude thresholder having at least one first input to receive the first intermediate photonic output signal from the phase demultiplexer, the first nonlinear amplitude thresholder configured to generate a first photonic thresholding signal of the at least one photonic thresholding signal by:
      saturating an amplitude of the received first intermediate photonic output signal to a first amplitude level, when the first nonlinear amplitude thresholder operates in the first operating regime,
      applying a transfer gain to the amplitude of the received first intermediate photonic output signal, when the first nonlinear amplitude thresholder operates in the second operating regime, or
      saturating the amplitude of the received first intermediate photonic output signal to a second amplitude level, when the first nonlinear amplitude thresholder operates in the third operating regime; and
   a second nonlinear amplitude thresholder having at least one second input to receive the second intermediate photonic output signal from the phase demultiplexer, the second nonlinear amplitude thresholder configured to generate a second photonic thresholding signal of the at least one photonic thresholding signal by:
      saturating an amplitude of the received second intermediate photonic output signal to the first amplitude level, when the second nonlinear amplitude thresholder operates in the first operating regime, applying the transfer gain to the amplitude of the received second intermediate photonic output signal, when the second nonlinear amplitude thresholder operates in the second operating regime, or saturating an amplitude of the received second intermediate photonic output signal to the second amplitude level, when the second nonlinear amplitude thresholder operates in the third operating regime.

8. The photonic circuit of claim 7, wherein the second set of one or more photonic gates comprises one or more photonic combiners having at least a pair of inputs to receive the first photonic thresholding signal and the second photonic thresholding signal from the first and second nonlinear amplitude thresholders, the one or more photonic combiners configured to generate the one or more photonic output signals by combining at least the first photonic thresholding signal and the second photonic thresholding signal.

9. The photonic circuit of claim 1, wherein the first set of one or more photonic gates comprises a beam splitter having at least one input to receive the one or more photonic signals from the one or more photonic input gates, the beam splitter configured to split the received one or more photonic signals into a first of the one or more intermediate photonic output signals and a second of the one or more intermediate photonic output signals.

10. The photonic circuit of claim 9, wherein the at least one nonlinear amplitude thresholder having at least one input to receive the second intermediate photonic output signal from the beam splitter, the at least one nonlinear amplitude thresholder configured to generate the at least one photonic thresholding signal by:

saturating an amplitude of the received second intermediate photonic output signal to a first amplitude level, when the at least one nonlinear amplitude thresholder operates in the first operating regime;

applying a transfer gain to the amplitude of the received second intermediate photonic output signal when the at least one nonlinear amplitude thresholder operates in the second operating regime; or saturating the amplitude of the received second intermediate photonic output signal to a second amplitude level, when the at least one nonlinear amplitude thresholder operates in the third operating regime.

11. The photonic circuit of claim 10, further comprising a phase shifter having at least one input coupled to an output of the at least one nonlinear amplitude thresholder to receive the at least one photonic thresholding signal, the phase shifter configured to shift a phase of the at least one photonic thresholding signal to generate a phase-shifted photonic signal.

12. The photonic circuit of claim 11, wherein the second set of one or more photonic gates comprises one or more photonic combiners having at least a pair of inputs to receive the first intermediate photonic output signal and the phase-shifted photonic signal, the one or more photonic combiners configured to generate the one or more photonic output signals by combining at least the first intermediate photonic output signal and the phase-shifted photonic signal.

13. The photonic circuit of claim 9, wherein the first set of one or more photonic gates further comprises a photonic attenuator having one or more inputs to receive the one or more intermediate photonic output signals from the beam splitter, the photonic attenuator configured to attenuate amplitudes of the received one or more intermediate photonic output signals to one or more configurable amplitude levels.

14. The photonic circuit of claim 1, wherein the at least one nonlinear amplitude thresholder comprises a resonator-based nonlinear optical device.

15. The photonic circuit of claim 1, wherein the at least one nonlinear amplitude thresholder comprises a cascading connection of one or more saturable absorbers and one or more semiconductor optical amplifier-based amplitude thresholders.

16. A non-transitory computer-readable storage medium comprising stored instructions that, when executed by at least one processor, cause the at least one processor to:

instruct one or more photonic input gates of a photonic circuit to receive one or more photonic input signals and generate one or more photonic signals based on the one or more photonic input signals;

instruct a first set of one or more photonic gates of the photonic circuit coupled to the one or more photonic input gates to generate one or more intermediate photonic output signals based on the generated one or more photonic signals;

instruct at least one nonlinear amplitude thresholder of the photonic circuit coupled to the first set of one or more photonic gates to generate at least one photonic thresholding signal based on at least one of the one or more intermediate photonic output signals, the at least one nonlinear amplitude thresholder operating in at least one of a first operating regime, a second operating regime, and a third operating regime; and instruct a second set of one or more photonic gates of the photonic circuit coupled to the at least one nonlinear amplitude thresholder to generate one or more photonic output signals based at least in part on the at least one photonic thresholding signal.

17. The computer-readable storage medium of claim 16, wherein the stored instructions comprise further stored instructions that, when executed, cause the at least one processor to:

instruct the one or more photonic input gates to generate the one or more photonic signals as an XOR logical function of a plurality of the one or more photonic input signals;

instruct the first set of one or more photonic gates to demultiplex the one or more photonic signals into a first of the one or more intermediate photonic output signals and a second of the one or more intermediate photonic output signals, based at least in part on a phase of the one or more photonic signals relative to a phase of a bias signal input into the phase demultiplexer;

instruct the at least one nonlinear amplitude thresholder to generate the at least one photonic thresholding signal that includes a first photonic thresholding signal and a second photonic thresholding signal, based on amplitudes of the first and second intermediate photonic output signals; and instruct the second set of one or more photonic gates to generate the one or more photonic output signals by combining the first photonic thresholding signal and the second photonic thresholding signal.

18. The computer-readable storage medium of claim 16, wherein the stored instructions comprise further stored instructions that, when executed, cause the at least one processor to:

instruct the one or more photonic input gates to generate the one or more photonic signals by combining a plurality of the one or more photonic input signals;

instruct the first set of one or more photonic gates to split the one or more photonic signals into a first of the one or more intermediate photonic output signals and a second of the one or more intermediate photonic output signals;

instruct the at least one nonlinear amplitude thresholder to generate the at least one photonic thresholding signal by processing amplitudes of the second intermediate photonic output signal;

instruct a phase shifter coupled to the at least one amplitude thresholder to shift a phase of the at least one photonic thresholding signal to generate a phase-shifted photonic signal; and instruct the second set of one or more photonic gates to generate the one or more photonic output signals by combining the first intermediate photonic output signal and the phase-shifted photonic signal.

19. The computer-readable storage medium of claim 16, wherein the stored instructions comprise further stored instructions that, when executed, cause the at least one processor to:

configure the at least one nonlinear amplitude thresholder to operate as a cascading connection of one or more saturable absorbers and one or more semiconductor optical amplifier-based amplitude thresholders.

20. A method comprising:

receiving, at one or more photonic input gates of a photonic circuit, one or more photonic input signals;

generating, by the one or more photonic input gate, one or more photonic signals based on the one or more photonic input signals;

generating, by a first set of one or more photonic gates of the photonic circuit coupled to the one or more photonic input gates, one or more intermediate photonic output signals based on the generated one or more photonic signals;

generating, by at least one nonlinear amplitude thresholder of the photonic circuit coupled to the first set of one or more photonic gates, at least one photonic thresholding signal based on at least one of the one or more intermediate photonic output signals, the at least one nonlinear amplitude thresholder operating in at least one of a first operating regime, a second operating regime, and a third operating regime; and generating, by one or more second photonic gates of the photonic circuit coupled to the at least one nonlinear amplitude thresholder, one or more photonic output signals based at least in part on the at least one photonic thresholding signal.

\* \* \* \* \*